US012485062B2

(12) United States Patent
Liu et al.

(10) Patent No.: US 12,485,062 B2
(45) Date of Patent: Dec. 2, 2025

(54) BATH MASSAGE CHAIR AND PILLOW

(71) Applicant: KOHLER CO., Kohler, WI (US)

(72) Inventors: Xinyao Liu, Sheboygan, WI (US); Sim Hao Jie, Singapore (SG); Jexter Lim Sen Ye, Singapore (SG); Loh Jun Kern, Singapore (SG)

(73) Assignee: KOHLER CO., Kohler, WI (US)

( * ) Notice: Subject to any disclaimer, the term of this patent is extended or adjusted under 35 U.S.C. 154(b) by 612 days.

(21) Appl. No.: 17/406,726

(22) Filed: Aug. 19, 2021

(65) Prior Publication Data

US 2022/0054351 A1 Feb. 24, 2022

Related U.S. Application Data

(60) Provisional application No. 63/164,168, filed on Mar. 22, 2021, provisional application No. 63/068,690, filed on Aug. 21, 2020.

(51) Int. Cl.
*A61H 23/02* (2006.01)

(52) U.S. Cl.
CPC ..... *A61H 23/02* (2013.01); *A61H 2201/0134* (2013.01); *A61H 2201/0149* (2013.01);
(Continued)

(58) Field of Classification Search
CPC ............ A61H 23/02; A61H 2201/0134; A61H 2201/0149; A61H 2201/0207;
(Continued)

(56) References Cited

U.S. PATENT DOCUMENTS 3,259,428 A * 7/1966 Wenger .................... A47C 9/08 211/85.6
4,037,591 A 7/1977 Sarno
(Continued)

FOREIGN PATENT DOCUMENTS

CN 203694036 U 7/2014
CN 107997866 A * 5/2018 ............... A61H 1/00
(Continued)

OTHER PUBLICATIONS

Written description and claims of JP2006255111A machine translation via espacenet (Year: 2006).*
(Continued)

*Primary Examiner* — Timothy A Stanis
*Assistant Examiner* — Tyler A Raubenstraw
(74) *Attorney, Agent, or Firm* — Foley & Lardner LLP

(57) ABSTRACT

A bath massage chair includes a pillow, a back support configured to support a torso of the user when the user is seated in the bath massage chair, and a seat coupled to the lower portion of the back support. The pillow includes a pillow massage system and a pillow heating element configured to heat the pillow. The back support includes an upper portion coupled to the pillow and a lower portion opposite the upper portion, a back massage system configured to massage the torso of the user, and a back heating element configured to heat the back support. The seat is configured to support a lower body of the user when the user is seated in the bath massage chair. The pillow massage system, pillow heating element, back massage system, and back heating element are operably coupled to a controller.

19 Claims, 17 Drawing Sheets

(52) U.S. Cl.
CPC ................ *A61H 2201/0207* (2013.01); *A61H 2201/1609* (2013.01); *A61H 2201/1623* (2013.01); *A61H 2201/501* (2013.01); *A61H 2203/02* (2013.01)

(58) Field of Classification Search
CPC .... A61H 2201/1609; A61H 2201/1623; A61H 2201/501; A61H 2203/02; A61H 33/00; A61H 33/0087; A61H 33/067; A61H 35/00; A61H 35/002; A61H 35/004; A61H 35/006; A61H 9/00; A61H 9/0078; A61H 2201/013; A61H 2201/0126; A61H 2201/0111; B64D 11/06; B60N 2/58
See application file for complete search history.

(56) References Cited

U.S. PATENT DOCUMENTS 4,574,786 A 3/1986 Hashimoto et al.
4,743,710 A 5/1988 Shieber et al.
4,839,930 A 6/1989 Watkins
4,872,229 A 10/1989 Brady
4,891,848 A * 1/1990 Carter .................... A47K 3/125 5/636
4,908,888 A * 3/1990 Watkins ............. A61H 33/6089 4/541.3
4,908,939 A 3/1990 Shieber et al.
4,935,972 A * 6/1990 Brady ...................... H05K 7/06 5/915
5,050,591 A * 9/1991 Sandrin ................ A61H 33/025 4/575.1
5,297,300 A * 3/1994 Sheu ...................... A47K 3/127 4/575.1
5,329,651 A 7/1994 Mardero et al.
5,333,324 A * 8/1994 Pinciaro ................. A61H 33/60 4/492
5,393,297 A 2/1995 Kristoff
5,459,887 A 10/1995 Roman et al.
5,561,868 A * 10/1996 Campbell .............. A47K 3/122 4/560.1
5,617,591 A 4/1997 Bloemer et al.
5,682,626 A * 11/1997 Banks, Jr ............... A47K 3/122 4/579
5,741,317 A * 4/1998 Ostrow .................. A61H 33/00 607/81
5,819,346 A * 10/1998 Lane ...................... H04R 5/023 5/639
5,896,596 A * 4/1999 Murakami ............... A47K 3/10 4/541.1
5,930,851 A * 8/1999 Brunelle .............. A61H 33/026 4/541.1
5,984,883 A 11/1999 Elnar
5,987,663 A * 11/1999 Ludlow .............. A61H 33/6063 4/541.1
6,105,182 A * 8/2000 Elnar ................. A61H 33/6089 248/295.11
6,183,430 B1 * 2/2001 Lin .................... A61H 33/6052 601/158
6,370,710 B1 * 4/2002 Haury ...................... A47K 3/14 4/578.1
6,387,063 B1 5/2002 Elnar
6,408,456 B1 * 6/2002 Fike ....................... A47K 3/122 4/560.1
6,436,060 B1 * 8/2002 Talish ...................... A61N 7/00 607/86
6,499,153 B1 * 12/2002 Simoni ................ A61H 1/0218 4/492
6,572,570 B1 * 6/2003 Burns ................ A61H 33/6089 601/148
6,770,043 B1 * 8/2004 Kahn ................... A61H 9/0071 601/169
6,974,425 B2 * 12/2005 Rogers ............... A61H 23/0236 601/46
7,189,211 B2 3/2007 Inada et al.
7,228,573 B2 6/2007 Smith
7,314,455 B1 1/2008 Hill
7,725,962 B1 * 6/2010 Smith .................... A45D 44/10 4/523
7,941,877 B2 * 5/2011 Gardenier .............. A47K 3/001 4/575.1
8,074,304 B1 * 12/2011 Snyder ................... A61H 33/60 4/496
8,512,265 B2 8/2013 Lev et al.
8,666,103 B2 * 3/2014 Hsieh ..................... H04R 1/028 4/575.1
8,668,045 B2 * 3/2014 Cohen ...................... H04R 5/04 181/150
9,630,533 B2 4/2017 Misch et al.
9,744,887 B2 8/2017 Durt et al.
10,063,952 B2 * 8/2018 Fuchs .................. A47G 9/1045
10,137,053 B2 * 11/2018 Sone .................. A61H 15/0078
10,235,033 B2 * 3/2019 Laflamme ........... G06F 3/04817
10,524,619 B2 * 1/2020 LeMay .................. A61H 33/60
10,660,479 B1 * 5/2020 Knight ................... A61H 33/60
10,660,480 B1 * 5/2020 Askins ................... A47K 3/282
10,881,251 B2 * 1/2021 Manchiraju ............ A47K 3/006
11,419,460 B2 * 8/2022 Shyka ................ A61H 33/6021
11,458,060 B2 * 10/2022 Anderson ................ A61H 1/02
2003/0025366 A1 2/2003 Barreiro, Jr.
2003/0060741 A1 3/2003 Park
2003/0139693 A1 7/2003 Swift
2004/0209536 A1 * 10/2004 Noble .................... A61H 7/001 441/125
2005/0138724 A1 * 6/2005 Owen .................... A47K 3/125 4/574.1
2006/0217645 A1 * 9/2006 Lockamy ............... A61G 15/10 601/150
2006/0260041 A1 * 11/2006 Paz ........................ A61H 7/004 4/573.1
2007/0240258 A1 * 10/2007 Roberts .................. A47K 3/125 4/575.1
2009/0025137 A1 * 1/2009 Otermans ............. A47K 3/125 4/575.1
2009/0105618 A1 * 4/2009 Ta .......................... A61H 23/04 601/49
2010/0217164 A1 * 8/2010 Meyer .................. A47C 31/008 601/84
2010/0231009 A1 9/2010 Chi
2010/0287694 A1 * 11/2010 Klewpatinond ....... A47K 3/022 4/546
2013/0161463 A1 * 6/2013 Toms ..................... A47C 1/126 248/240.4
2013/0289451 A1 * 10/2013 Yu ............................ A61F 7/00 601/134
2014/0371642 A1 * 12/2014 Torregrosa Pascual .................... A61H 9/0007 601/158
2015/0067960 A1 * 3/2015 Stromberg ............. A47K 3/282 4/611
2015/0133834 A1 5/2015 Ran
2016/0206108 A1 * 7/2016 Müller ................... A47K 3/125
2016/0235255 A1 * 8/2016 Leichsenring ......... A47C 11/00
2016/0271012 A1 * 9/2016 Xu ..................... A61H 33/6021
2016/0374897 A1 * 12/2016 Carey .................... A61H 33/06 4/568
2017/0156655 A1 6/2017 Austin et al.
2017/0296003 A1 * 10/2017 Hoesman ............... A47K 3/122
2019/0038229 A1 * 2/2019 Perraut ................ A61H 9/0078
2019/0077289 A1 3/2019 Mergl et al.
2019/0344043 A1 * 11/2019 Migneco ............... A61M 21/00
2020/0010197 A1 * 1/2020 Otovic ................. B60N 2/5883
2020/0022536 A1 * 1/2020 Malassigné ............ A47K 3/122
2020/0054176 A1 * 2/2020 Malassigné ............ A47K 3/125
2020/0054517 A1 * 2/2020 Hunt ...................... A61H 7/007
2020/0060481 A1 * 2/2020 Huang ................... A47K 3/122
2020/0085673 A1 3/2020 Seo et al.
2020/0179201 A1 * 6/2020 Dancy .................... A47K 3/006
2020/0229653 A1 * 7/2020 Williams ............... A47K 3/282
2020/0238877 A1 7/2020 Heiden et al.
2020/0276076 A1 * 9/2020 Lunter ................. A61H 9/0021

(56) References Cited

U.S. PATENT DOCUMENTS

| | | | | |
|---|---|---|---|---|
| 2020/0318376 | A1* | 10/2020 | Ruggiero | A61M 21/02 |
| 2020/0345579 | A1* | 11/2020 | Luong | A61H 35/006 |
| 2021/0007928 | A1 | 1/2021 | Howe | |

FOREIGN PATENT DOCUMENTS

| | | | | | |
|---|---|---|---|---|---|
| CN | 109363542 | A | | 2/2019 | |
| CN | 110013433 | A | | 7/2019 | |
| CN | 110464527 | A | * | 11/2019 | |
| CN | 110882148 | A | | 3/2020 | |
| JP | 2006255111 | A | * | 9/2006 | |
| WO | WO-2004067106 | A1 | * | 8/2004 | A63B 21/0084 |
| WO | WO-2011096817 | A1 | * | 8/2011 | A47C 1/121 |

OTHER PUBLICATIONS

Written description and claims of CN110464527A machine translation via espacenet (Year: 2019).*
Written description and claims of CN107997866A machine translation via espacenet (Year: 2018).*
First Office Action on Chinese Patent App. No. 202110966949.7 dated Aug. 30, 2023, 17 pages (with English summary).

* cited by examiner

BATH MASSAGE CHAIR AND PILLOW

CROSS-REFERENCE TO RELATED PATENT APPLICATIONS

This application claims the benefit of and priority to U.S. Provisional Patent Application No. 63/164,168 filed Mar. 22, 2021, and U.S. Provisional Patent Application No. 63/068,690 filed Aug. 21, 2020, the entire disclosures of which are incorporated by reference herein.

BACKGROUND

The present disclosure relates generally to a hydrotherapy module. More specifically, the present disclosure relates to a hydrotherapy module for use in wet environments, such as a bathing environment.

SUMMARY

At least one embodiment relates to a bath massage chair. A bath massage chair configured to be removably coupled to a bathtub and at least partially submerged in water within the bathtub when in use. The bath massage chair includes a pillow configured to support a head or neck of a user when the user is seated in the bath massage chair, a back support configured to support a torso of the user when the user is seated in the bath massage chair, and a seat coupled to the lower portion of the back support. The pillow includes a pillow massage system configured to massage the head or neck of the user and a pillow heating element configured to heat the pillow. The back support includes an upper portion coupled to the pillow and a lower portion opposite the upper portion, a back massage system configured to massage the torso of the user, and a back heating element configured to heat the back support. The seat extends perpendicular from the back support and is configured to support a lower body of the user when the user is seated in the bath massage chair. The pillow massage system, pillow heating element, back massage system, and back heating element are operably coupled to a controller. The controller is configured to control the pillow massage system, pillow heating element, back massage system, and back heating element.

In some embodiments, the pillow further comprises an audio system configured to output sound through a speaker, the speaker is coupled to the back support, and the audio system is operably coupled to the controller.

In some embodiments, the audio system comprises a first audio system and a second audio system. The first audio system is positioned opposite the second audio system along a horizontal axis of the pillow.

In some embodiments, the bath massage chair further includes a track extending along a longitudinal axis of the back support between the upper portion and the lower portion of the back support.

In some embodiments, the pillow massage system includes a first massage actuator and a second massage actuator, the first massage actuator positioned opposite the second massage actuator along a horizontal axis of the pillow.

In some embodiments, wherein the back massage system includes a third massage actuator and a fourth massage actuator coupled to one another by a skeleton, the third massage actuator positioned opposite the fourth massage actuator.

In some embodiments, the back support further includes a battery configured to provide power to the bath massage chair.

In some embodiments, the seat comprises a bumper positioned proximate an end of the seat, the bumper configured to abut a horizontal surface of the bathtub when the bath massage chair is coupled to the bathtub.

Another example embodiment relates to a bath massage system. The bath massage system is configured to be removably coupled to a bathtub and ad least partially submerged in water within the bathtub when in use. The bath massage system includes a back support configured to support a torso of the user when the user is seated in the bath massage system. The back support includes a back massage system including one or more actuators and a back heating element coupled to the back massage system. The back heating element is configured to heat the back support.

In some embodiments, the bath massage system further includes a pillow configured to support a head or neck of the user when the user is seated in the bath massage system. The bath massage system includes a pillow massage system configured to massage the head or neck of the user and a pillow heating element configured to heat the pillow. The pillow massage system comprising a first massage actuator and a second massage actuator. The first massage actuator positioned opposite the second massage actuator along a horizontal axis of the pillow.

In some embodiments, the bath massage system further includes a seat coupled to the lower portion of the back support, extending substantially perpendicular to the back support, and configured to support a lower body of the user when the user is seated in the bath massage system.

In some embodiments, the back massage system includes a third actuator and a fourth actuator positioned opposite the third actuator, the third actuator coupled to the fourth actuator by a skeleton extending therebetween.

In some embodiments, the back heating element comprises a first heating element and a heating element positioned opposite the first heating element. The first heating element is coupled to the third actuator and the second heating element is coupled to the fourth actuator.

In some embodiments, the bath system further includes a mounting assembly coupled rearward the back support, the mounting assembly comprises a first receiving end coupled to the back support and a second receiving end coupled to the bathtub.

In some embodiments, the bath system further includes a track extending between an upper portion and a lower portion of the back support, the one or more actuators coupled to the track.

Another example embodiment relates to a bath massage pillow. The bath massage pillow is configured to be removably coupled to a bathtub and to support a head or neck of a user in the bathtub. The bath massage pillow includes a first end, a second end positioned opposite the first end, a body portion extending between the first end and the second end. The body portion includes a pillow massage system configured to massage the head or neck of the user and a heating element positioned proximate the massage system and configured to heat the pillow.

In some embodiments, the bath massage pillow further includes a controller operably coupled to the massage system, the heating element, and the audio system, the controller configured to actuate the massage system, the heating element, and the audio system between an on and off position In some embodiments, a length of the body portion in a first direction extending from the first end to the second end is approximately twice a height of the body portion in a second direction perpendicular the first direction.

In some embodiments, the bath massage pillow further includes a first audio system and a second audio system. The first audio system is coupled to the first end and the second audio system is coupled to the second end.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
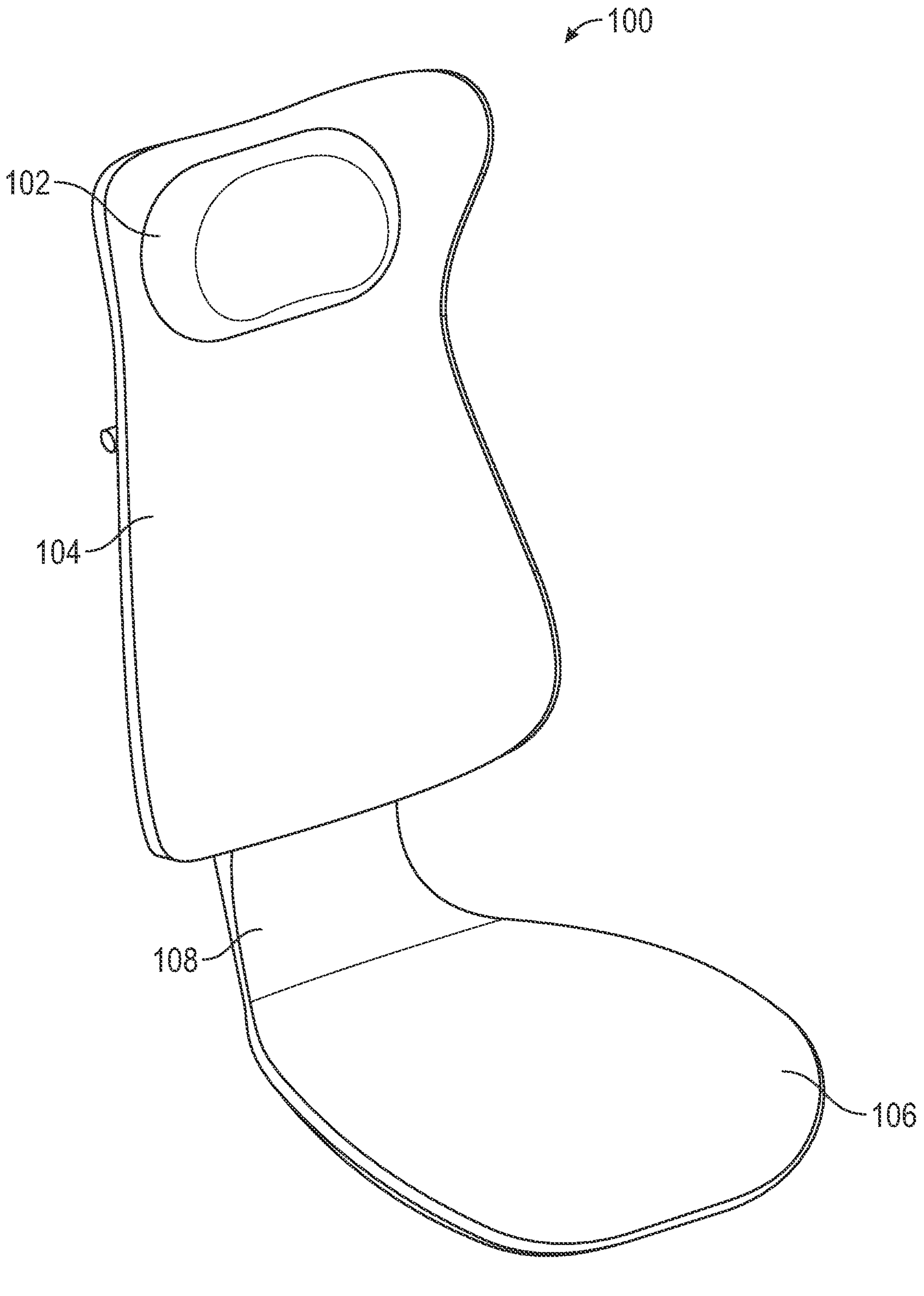
FIG. 1 is an orthogonal view of a hydrotherapy module, according to an example embodiment.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a hydrotherapy module 100 is disclosed according to various embodiments. The hydrotherapy module 100 is configured for use in a wet environment, such as a bathtub, pool, spa, water park, beach, or in the rain. The hydrotherapy module 100 may include at least one of a pillow, a back support module, or a seat support module. In various embodiments, the hydrotherapy module 100 and/or any other hydrotherapy modules described herein may take the form of a bath massage chair, a bath massage system, and/or a bath massage pillow.

According to an example embodiment, the pillow includes an audio system that may play music or sounds as desired by a user of the hydrotherapy module 100. For example, a user may pair (e.g., wirelessly connect) a wirelessly-capable device (e.g., controller) to the hydrotherapy module 100 and control the audio that is projected by the pillow from the wirelessly-capable device. The pillow further includes a pillow massage system and a heating element that may provide warmth and comfort to the user. For example, a user may turn on the pillow massage system to provide vibration to a portion of the user's body. The hydrotherapy module 100 is further configured to provide a soft, compressible surface for a user to rest a portion of their body, such as a head, leg, arm, or torso. According to an example embodiment, the pillow may be supported above (e.g., outside of) the basin of the bathtub, such as by a stand, clamp, or other fixture coupled to the bathtub. Thus, the pillow may be positioned such that a user may rest their head on the pillow, and the fixture coupled to the bathtub provides support to the pillow.

The back support module includes a back massage system that may provide at least one of vibration and heat to body of the back support module. The back support module includes a track, where the back massage system can be selectively repositionable along the length of the track. The back support module is further configured to provide support to the mid-section of a user's body (e.g., torso, back, etc.). According to an example embodiment, the back support module is configured to be positioned along a sidewall in a bathing environment. In such an embodiment, the back support module may be substantially parallel to the sidewall. The seat support module is configured to be selectively repositionable proximal or distal to the back support module and provide support to the user. According to an example embodiment, the seat support module may be distal to the back support module. For example, the seat support module is positioned distal to the back support module if the user is tall or may want to be positioned lower in a bathing environment.

Figure 3:
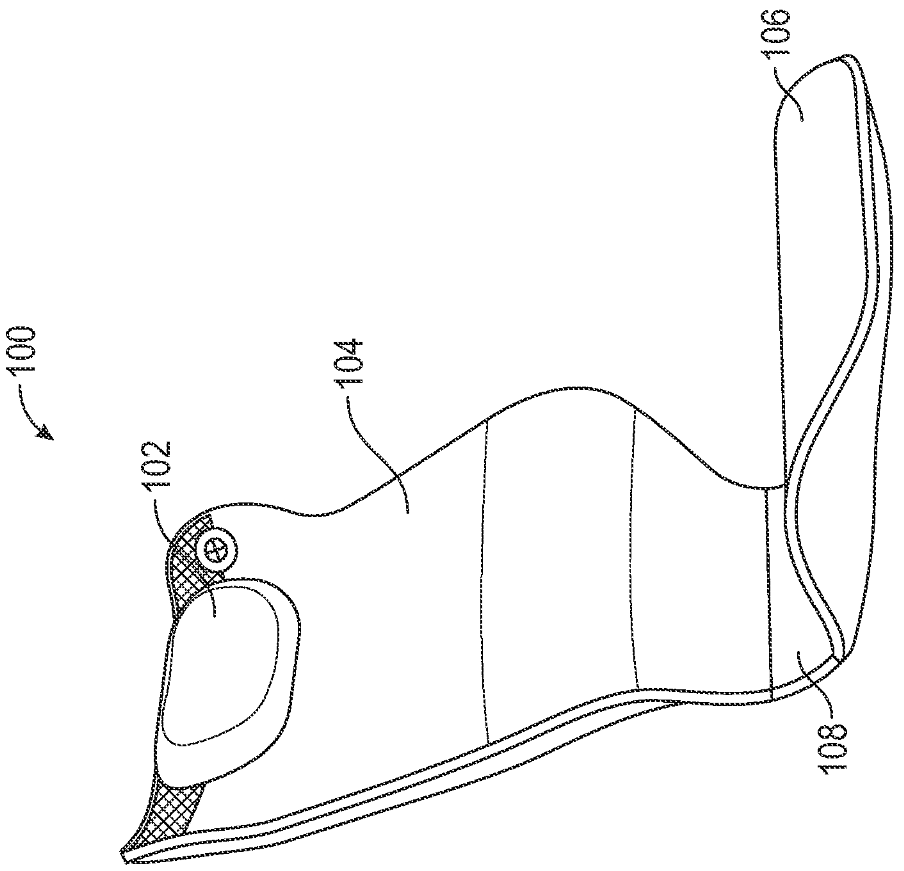
FIG. 3 is a perspective view of the hydrotherapy module of FIG. 1, according to an example embodiment.
Figure 2:
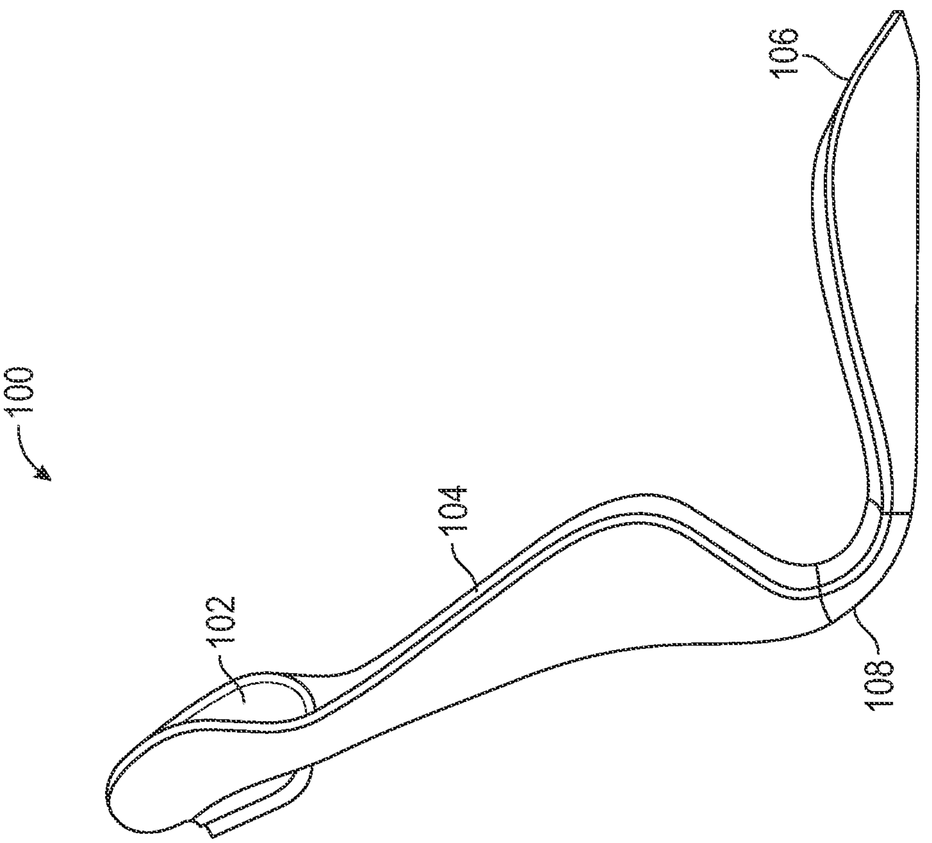
FIG. 2 is a side view of the hydrotherapy module of FIG. 1, according to an example embodiment.

Referring generally to FIGS. 1-3, a perspective view of the hydrotherapy module 100 is shown according to an example embodiment. The hydrotherapy module 100 may be configured for use in a bathing environment (e.g., tub, spa, shower, swimming pool, etc.). The hydrotherapy module 100 may include a pillow 102, a back support module 104, and a seat support module 106. The pillow 102 may be selectively coupled to the back support module 104 by an adhesive, a tape, a bracket, a magnet, or a similar structure. The back support module 104 may be selectively coupled to the seat support module 106 by a frame 108. To be more precise, the frame 108 may be coupled to at least one of an edge of the back support module 104 and an edge of the seat support module 106. According to an example embodiment, the frame 108 extends through at least a portion of the length of at least one of the back support module 104 and the seat support module 106. In still other embodiments, the frame 108 extends through the length of the pillow 102. The seat support module 106 may extend substantially perpendicular from the back support module 104, where substantially perpendicular may include a range or configurations (e.g., plus or minus 5 degrees, 10 degrees, 20 degrees, 30 degrees, 45 degrees, etc.). The frame 108 may be manufactured out of a rubber material, where the rubber material has enough structural rigidity to support the user and does not retain water. According to an example embodiment, the frame 108 may be manufactured out of an alternate material such as composite, metal, fiberglass, or the like. The hydrotherapy module 100 may be positioned along a sidewall in a bathing environment (e.g. a bathtub, whirlpool, etc.). According to an example embodiment, the hydrotherapy module 100 can be positioned along a plurality of sidewalls. In still some embodiments, the hydrotherapy module 100 may not positioned along a sidewall.

Figure 5:
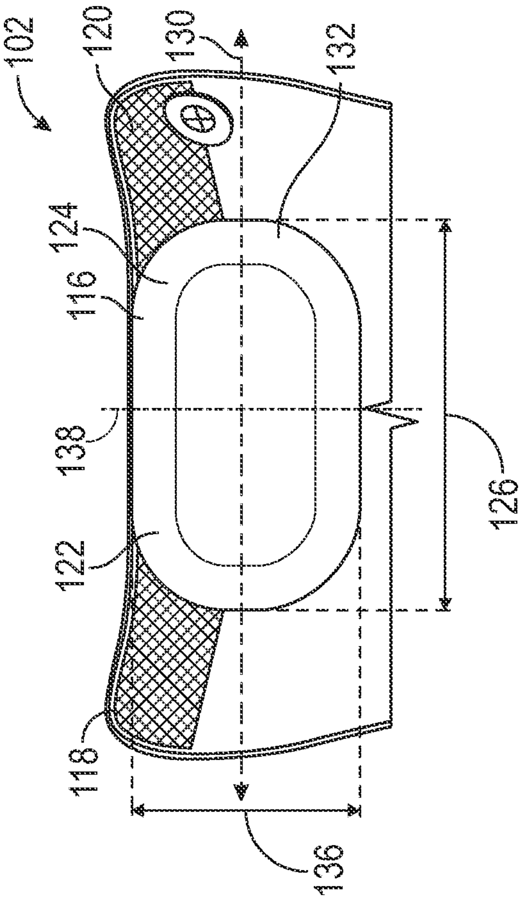
FIG. 5 is a front view of a pillow of the hydrotherapy module of FIG. 1, according to an example embodiment.
Figure 4:
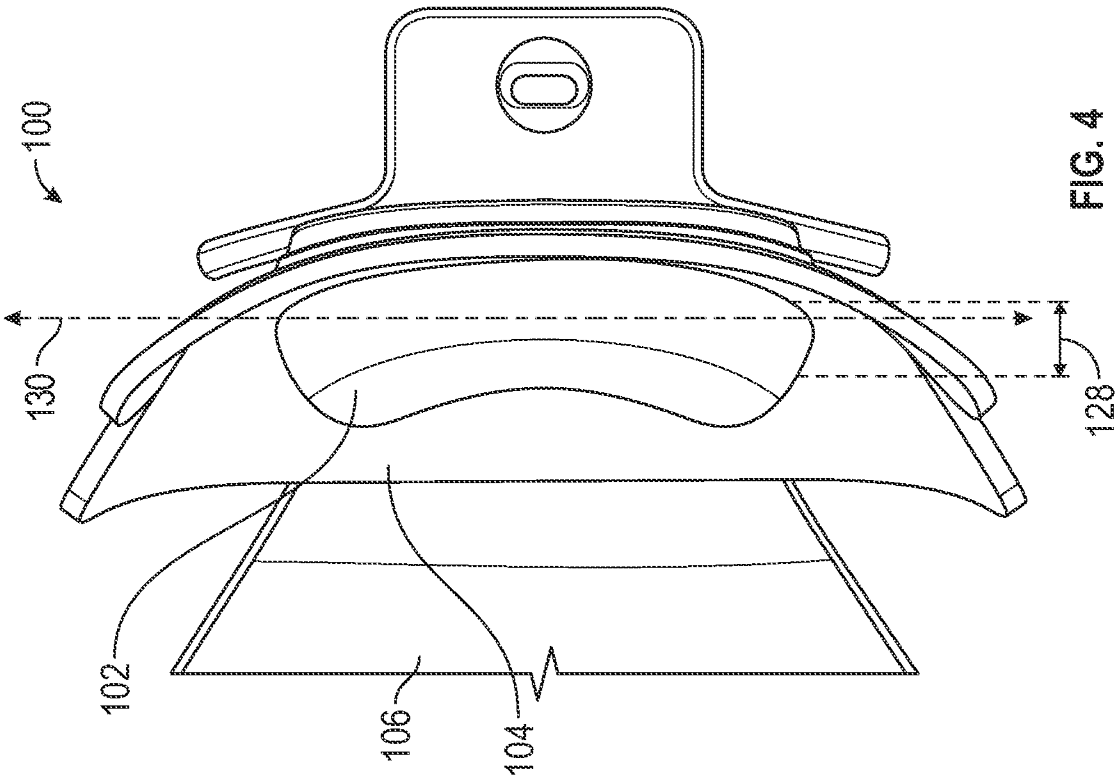
FIG. 4 is a top view of a portion of the hydrotherapy module of FIG. 1, according to an example embodiment.

Referring now to FIGS. 4 and 5, various views of a portion of the hydrotherapy module 100 is shown. The pillow 102 can further include a width, shown as pillow width 128. The pillow width 128 may be the width of the pillow from a front face of the pillow 102 to the rear face of the pillow 102. The pillow 102 includes body portion 116, a first audio system 118, and a second audio system 120. The first audio system 118 may be coupled proximate a first body end 122 of the body portion 116, and the second audio system 120 may be coupled proximate a second body end 124 of the body portion 116. The body portion 116 may be defined to be positioned between the first body portion 122 and the second body portion 124. The first body end 122 and the second body end 124 may be separated by a distance, shown as body length 126. According to an example embodiment, the body portion 116 defines a generally elongate body, where the body length 126 is greater than a body width 128 (e.g., an average body width). According to an example embodiment, the body length 126 is at least twice as great as the body width 128. The pillow 102 defines a horizontal central axis 130 that extends between the first body end 122 and the second body end 124. According to an example embodiment, the horizontal central axis 130 is substantially perpendicular to a plane defined by the first body end 122 and substantially perpendicular to a plane defined by the second body end 124. As shown, the pillow 102 is symmetrical about the horizontal central axis 130. However, According to an example embodiment, the pillow 102 may not be symmetrical about the horizontal central axis 130.

As shown, the pillow 102 includes a body height 136. In general, the body height 136 may be greater than the body width 128. According to an example embodiment, the body width 128 is greater than the body height 136. The pillow 102 may further include a vertical central axis 138 positioned at the midpoint of the body width 128 (e.g. approximately half the distance of the body width 128). According to an example embodiment, the vertical central axis 138 is not positioned at the midpoint of the body width 128.

Referring still to FIGS. 4 and 5, the pillow 102 includes an outer cover, shown as a pillow cover 132, extending between the first body end 122 and the second body end 124. The pillow cover 132 may be a single piece of fabric, cloth, or leather. According to an example embodiment, the body portion 116 is formed of a foam disposed within the pillow cover 132. According to an example embodiment, the body portion 116 includes a compressible cushion wrapped in the pillow cover 132. The pillow cover 132 may be a waterproof fabric. The pillow cover 132 may include a seam where the two ends of the pillow cover 132 are joined together. According to an example embodiment, the body portion 116 does not include the pillow cover 132, but instead is formed of an extruded piece of material, such as memory foam, plastic, polymer, rubber, or similar material or combinations of materials. The pillow cover 132 may be formed by extruding a material, such as polymer or rubber. According to an example embodiment, the body portion 116 is formed of an absorbent material so that the body portion 116 may absorb an amount of water or other fluid. According to an example embodiment, the body portion 116 is formed of a material that is less dense than water and configured to keep the pillow 102 afloat should the pillow 102 be dropped into a body of water (e.g., bathtub, pool etc.). According to an example embodiment, the body portion 116 and is configured to form an air-tight body configured to retain air within.

Figure 6:
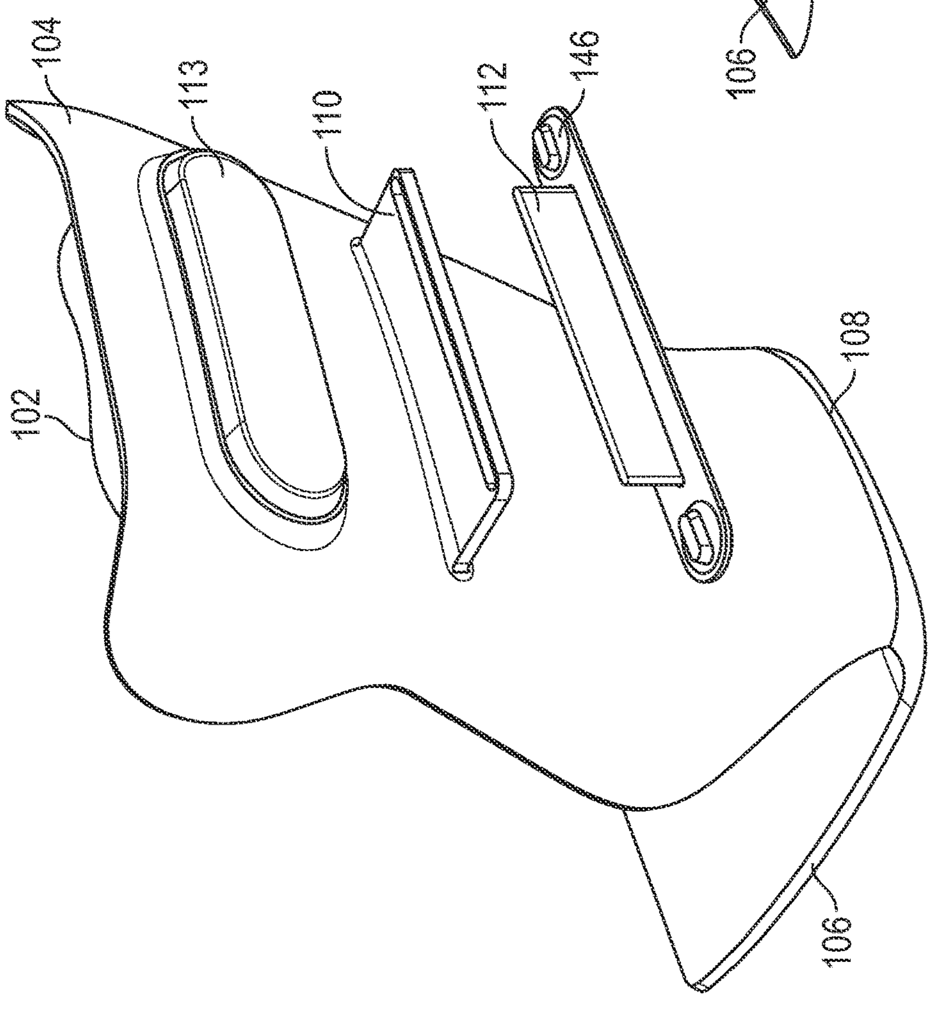
FIG. 6 is a rear, perspective view of the hydrotherapy module of FIG. 1, according to an example embodiment.

Referring now to FIG. 6, a perspective view of a portion of the hydrotherapy module 100 is shown. The hydrotherapy module 100 may include a support structure, shown as mounting system 110. The mounting system 110 is configured to couple the hydrotherapy module 100 to the bathing environment with an interface, shown as mounting flange 112. By way of example, the mounting system 100 may be a prismatic structure, with a slot positioned distal the back support module 104. In such an example, the slot may be configured to receive the mounting flange 112 such to selectively couple the hydrotherapy module to the bathing environment. The mounting flange 112 is selectively coupled to the bathing environment by a mounting bracket 146. The mounting bracket 146 may be selectively coupled to the bathing environment. The mounting flange 112 is proximally coupled to the mounting bracket 146 and positioned perpendicular to the mounting bracket 146.

Referring still to FIG. 6, the hydrotherapy module 100 includes a power device, shown as battery 113. The battery 113 is selectively coupled to the rear of the back support module 104. According to an example embodiment, the battery 113 may be coupled to the rear of the pillow 102. To be more precise, the battery 113 may be selectively coupled to the back support module 104, where the battery 113 is removable for charging or replacement purposes. According to an example embodiment, the battery 113 may be fixedly coupled to the back support module 104. The battery 113 may be configured to provide power to at least one of the accessories of the hydrotherapy module 100 (e.g., pillow massage actuator, pillow heating element, back massage actuator, back heating element, audio system, etc.).

Figure 7:
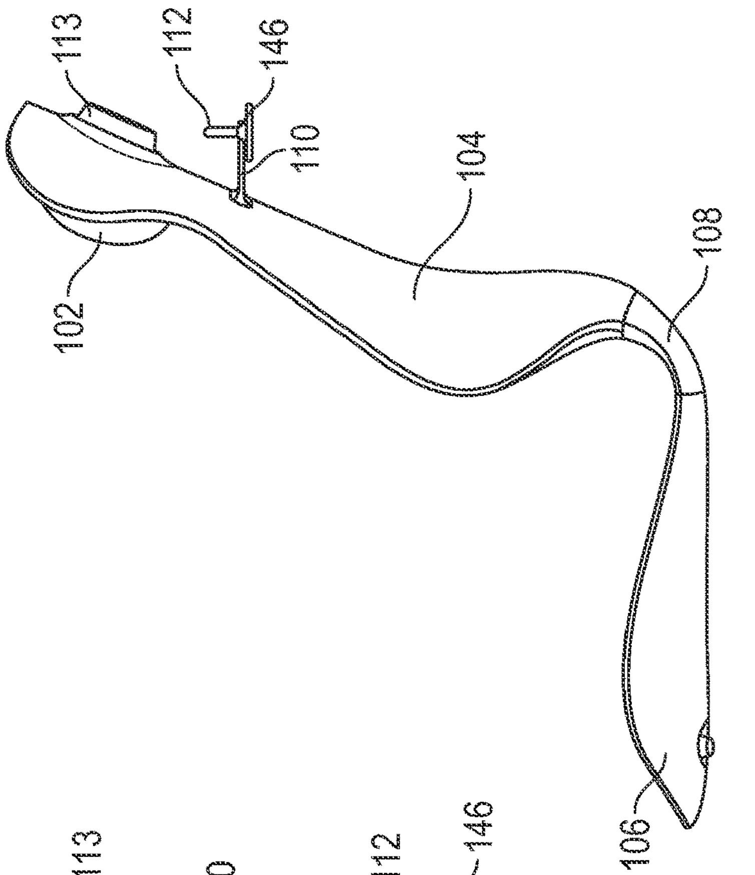
FIG. 7 is a side view of the hydrotherapy module of FIG. 1, according to an example embodiment.
Figure 9:
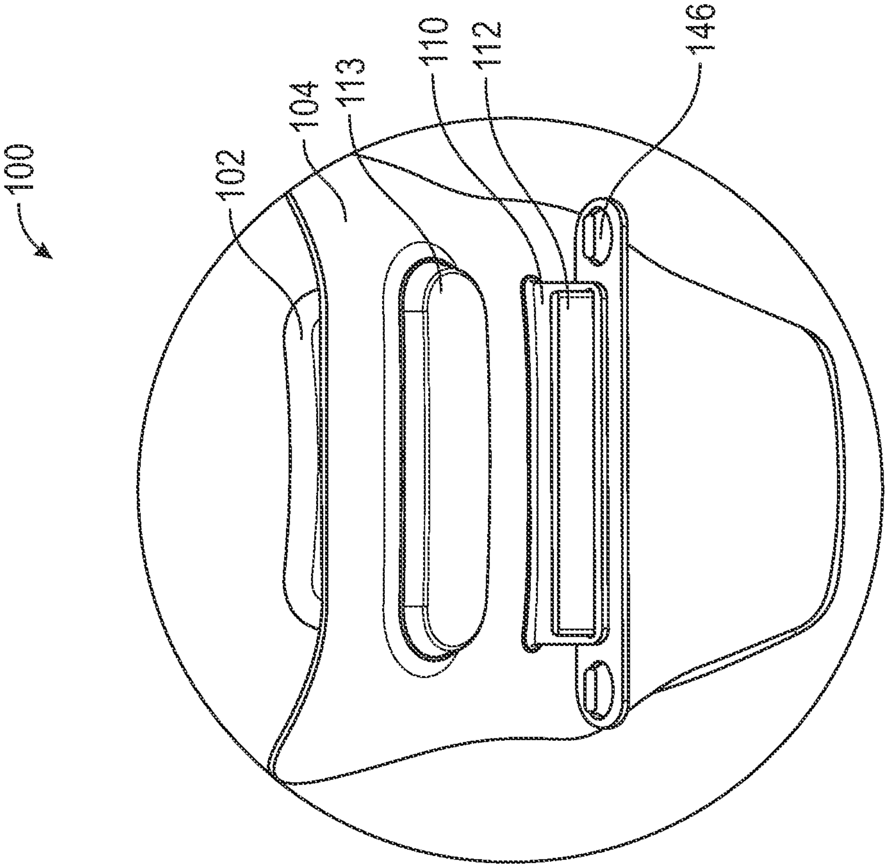
FIG. 9 is a top, perspective view of the hydrotherapy module of FIG. 1, according to an example embodiment.
Figure 8:
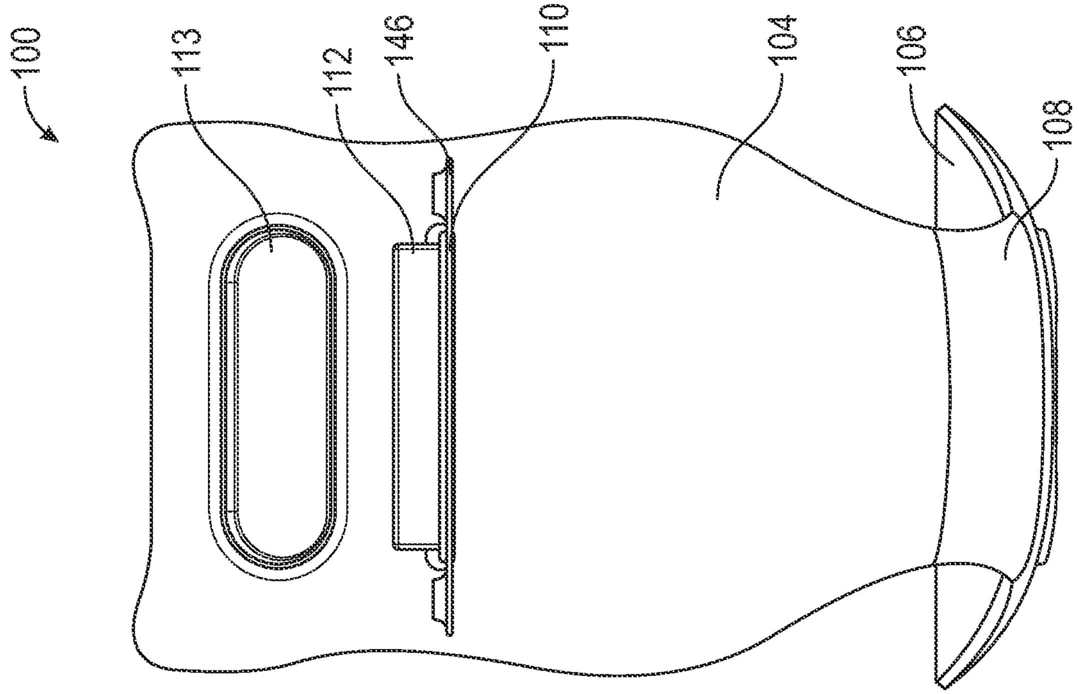
FIG. 8 is a rear view of the hydrotherapy module of FIG. 1, according to an example embodiment.

Referring now to FIGS. 7-9, a side view of the hydrotherapy module 100 is shown. The battery 113 may be positioned between the top of the hydrotherapy module 100 and the mounting system 110, rearward the back support module 104. According to an example embodiment, the mounting system 110 may be positioned between the top of the hydrotherapy module 100 and the battery 113. As shown, the mounting system 110 may receive the mounting flange 112 therethrough. The mounting bracket 146 may be selectively coupled to the bathing environment by a set of coupling mechanisms positioned opposite one another along the length of the mounting bracket 146. The coupling mechanisms may be suction cups, magnets, fasteners, or any similar coupling mechanism that may couple the mounting bracket 146 to the bathing environment.

Figure 10:
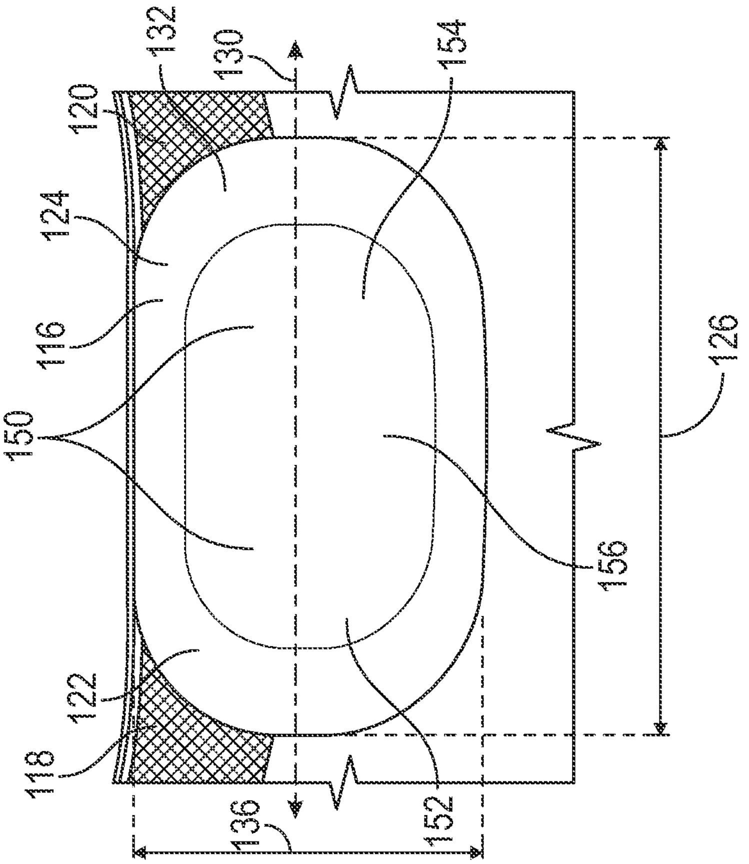
FIG. 10 is a front view of the pillow of the hydrotherapy module of FIG. 1, according to an example embodiment.

Referring to FIG. 10, a perspective view of the pillow 102 of FIG. 1 is shown. The pillow 102 further includes a massage system, shown as pillow massage system 150. The pillow massage system 150 may be coupled to the body portion 116 and is positioned between the first body end 122 and the second body end 124. The pillow massage system 150 may be configured to vibrate the entirety of the body portion 116. In some configurations, the pillow massage system 150 is a roller that has a direction of travel along the body length 126. The pillow massage system 150 may define a first massage actuator 152 and a second massage actuator 154. The first massage actuator 152 can be proximally coupled to the first body end 122. The second massage actuator 154 is proximally coupled to the second body end 124. According to an example embodiment, both the first massage actuator 152 and the second massage actuator 154 may be proximally coupled to the first body end 122. The first massage actuator 152 and the second massage actuator 154 may be proximally coupled to the second body end 124. The first massage actuator 152 and the second massage actuator 154 may be positioned along the horizontal central axis 130 of the pillow 102. According to an example embodiment, the first massage actuator 152 and the second massage actuator 154 are not positioned along the horizontal central axis 130 (e.g. positioned above or below the horizontal central axis 130). The pillow 102 may further include a warming element, shown as pillow heating element 156. The pillow heating element 156 is configured to provide heat energy to the pillow 102. According to an example embodiment, the heating element is configured to provide heat energy within the body portion 116. The pillow heating element 156 may be disposed within the body portion 116 along the length of the horizontal central axis 130.

The first audio system 118 and the second audio system 120 may be configured to output sound, where a signal from a wireless device controls the sound. For example, the first audio system 118 and the second audio system 120 may be configured to play music, or any additional outputs. The first audio system 118 and the second audio system 120 may also receive a signal to turn up or turn down the volume of the outputted sound.

Figure 11:
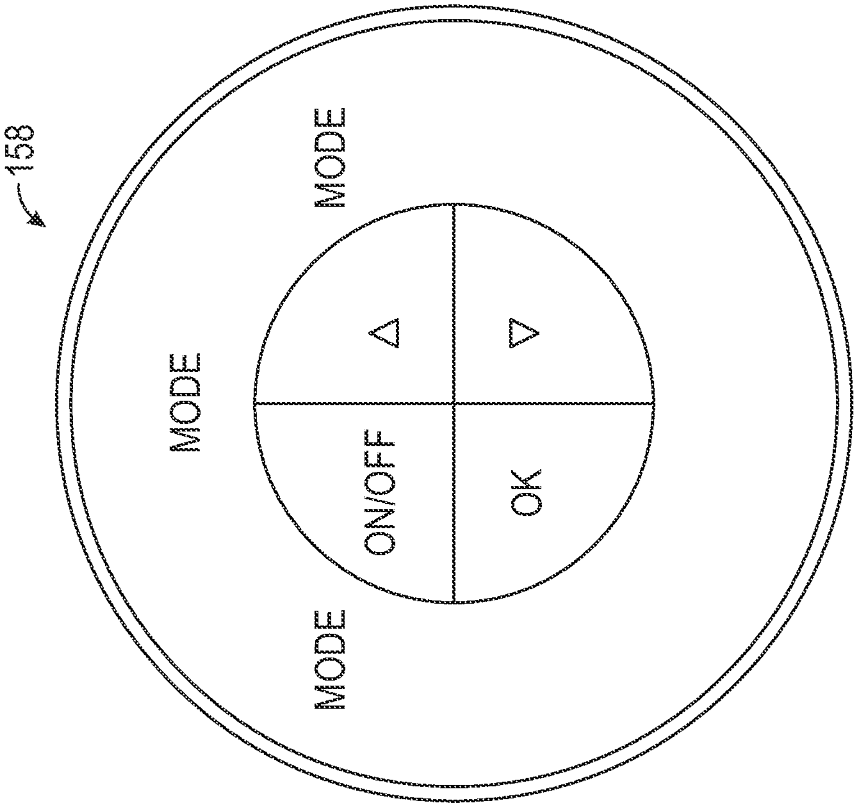
FIG. 11 is a front view of a controller of the hydrotherapy module of FIG. 1, according to an example embodiment.

Referring to FIG. 11, a front view of a controller 158 is shown. The controller 158 may be operably coupled to the hydrotherapy module 100. The controller 158 may be configured to send signals to the hydrotherapy module 100 to control accessories (e.g., first audio system 118, second audio system 120, pillow massage system 150, pillow heating element 156). The accessories are presets on the controller 158, where each accessory can be controlled independently. The signals sent by the controller 158 can be configured to at least provide commands to turn on at least one of the first audio system 118, the second audio system 120, the pillow massage system 150, the pillow heating element 156, the back heating element 275 (e.g., shown in FIG. 14) and a volume up/down command. The controller 158 may be configured to be a wireless device. For example, the controller 158 does not need a communication cable to link to the hydrotherapy module 100. The controller 158 can be selectively repositionable about a bathing environment (e.g., mobile). The controller 158 may be selectively coupled to the bathing environment by a coupling device (e.g., magnet, screw, bolt, suction, etc.). According to an example embodiment, the controller 158 is not selectively repositionable about the bathing environment and instead is fixedly coupled to the bathing environment.

Figure 12:
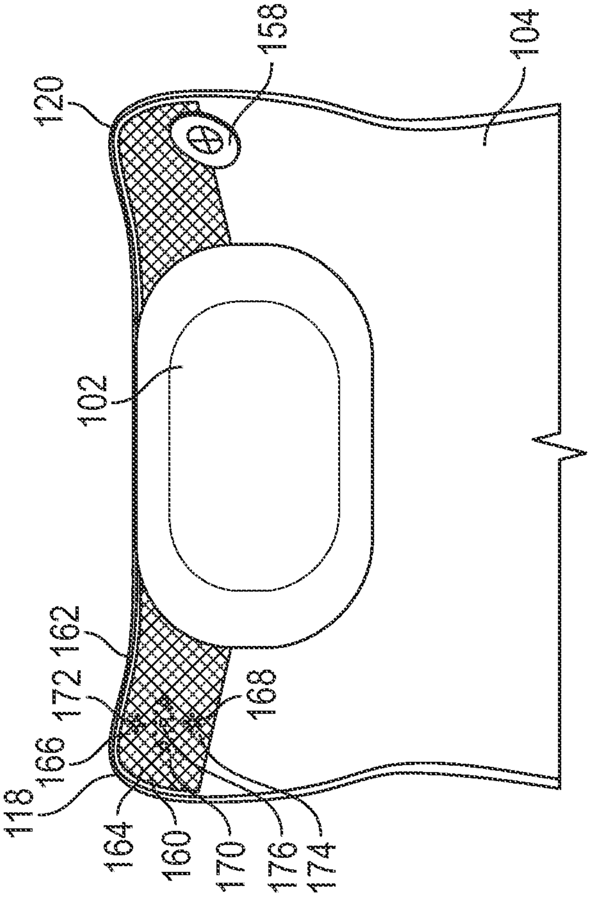
FIG. 12 is a front view of a portion of the hydrotherapy module of FIG. 1, including a pillow and a controller, according to an example embodiment.

Turning now to FIG. 12, the first audio system 118 can include at least one of a speaker screen 160, a first interface 162, and a second interface 164. The speaker screen 160 may be formed of a metallic material to provide aesthetic effect and support to the pillow 102. According to an example embodiment, the speaker screen 160 may be formed of a permeable fabric of mesh to provide a desired aesthetic effect. Positioned around the speaker screen 160, proximate to the first body end 122, is the first interface 162. The first interface 162 is configured to receive a user input to control both the first audio system 118 and the second audio system 120. For example, the first interface 162 may be configured to power on the first audio system 118 and the second audio system 120.

Referring still to FIG. 12, positioned behind (e.g., beneath) the speaker screen 160 is the second interface 164. The second interface 164 is configured to receive a user input to control operation of the first audio system 118 and the second audio system 120. When the user input is received by the user, the second interface in configured to send a signal to a processor to control an output of the first audio system 118, the second audio system 120, or both the first audio system 118 and the second audio system 120. The hands of the user may be wet when interacting with the second interface 164, and thus the speaker screen 160 may improve the grip or traction of the user's fingers when interacting with the second interface 164. The second interface 164 includes a first control 166, a second control 168, and a third control 170 positioned between the first control 166 and the second control 168. The first control 166 is configured to receive a user input. The first control 166 may be a pressure sensor configured to send a signal to a controller of the pillow 102, such as a "volume up" command. To assist in locating the first control 166, the first control 166 may include a first indicator 172, such as a light or LED positioned below the speaker screen 160. The second control 168 may be similar to the first control 166. The second control 168 may be a pressure sensor, push button sensor, capacitive sensor, or contact switches (such as those used in calculators). When the second control 168 is interfaced with, the second control 168 may send a "volume down" signal to the first audio system 118 and the second audio system 120. The second control 168 may include a second indicator 174, such as a light that shows the user where the second control 168 is to be contacted.

Referring still to FIG. 12, between the first control 166 and the second control 168 is the third control 170. The third control 170 is similar to the first control 166 and the second control 168. The third control 170 may be a pressure sensor, push button sensor, capacitive sensor, or contact switch. When a user of the pillow 102 interfaces with the third control 170, the third control 170 may send a signal to the controller 158 of the pillow 102 to "play" or "pause" the sound coming from the first audio system 118 and the second audio system 120. According to an example embodiment, the third control 170 is configured to send a signal directly to the controller 158 to pause the sound being transmitted from the controller 158. The third control 170 may be programmable by the user to operate the first audio system 118 and the second audio system 120 in a desired way. For example, the user my program the third control 170 such that double-tapping the third control 170 skips to the next track or song. According to an example embodiment, the use may program the third control 170 such that double-tapping the third control 170 causes the source to change from a first wirelessly-capable device to a second wirelessly-capable device. The third control 170 further includes a third indicator 176. The third indicator 176 may indicate a volume level of the pillow 102, a battery level, a power/stand-by mode, or may indicate where the third control 170 is positioned. While the third indicator 176 is shown in FIG. 12 as a plurality of dots, the third indicator 176 may be a continuous bar, a circle of shapes, or a large color-changing light.

Figure 13:
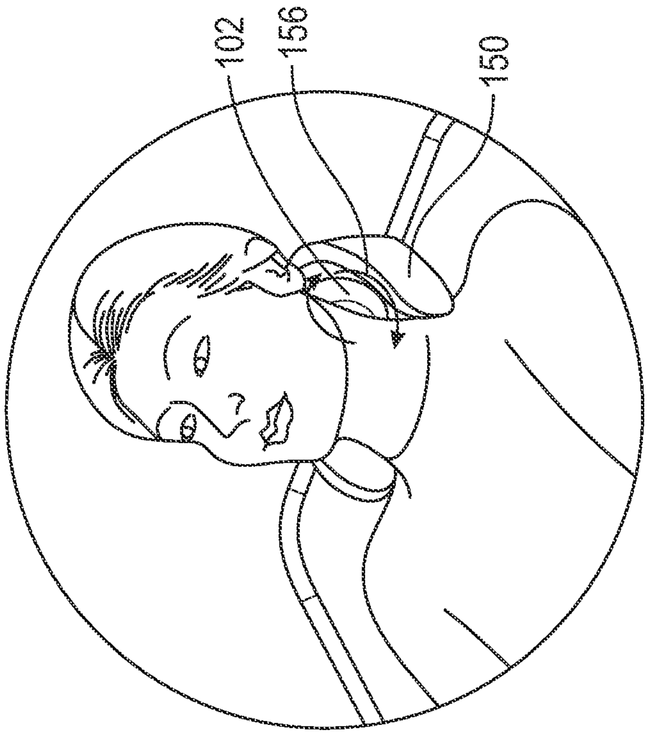
FIG. 13 is a front, perspective view of a pillow of the hydrotherapy module of FIG. 1, shown in a bathing environment, according to an example embodiment.

Referring now to FIG. 13, the pillow 102 is shown, according to an example embodiment. The pillow heating element 156 may be coupled to or integrally formed with the body portion 116. The pillow heating element 156 is configured to increase the temperature of (e.g., add heat to) the body portion 116. For example, a user may operate an application on a mobile device to control the temperature of the body portion 116. The pillow heating element 156 may extend from the first body end 122 and the second body end 124 and interface with the pillow cover 132 to increase the temperature of the pillow cover 132. According to an example embodiment, the pillow heating element 156 is disposed entirely underneath the pillow cover 132. Similar to the pillow heating element 156, the pillow massage system 150 may be coupled with the body portion 116 and positioned underneath the pillow cover 132. According to an example embodiment, the pillow massage system 150 interfaces with the pillow cover 132. When a user interfaces with the pillow 102, the user may feel the pillow massage system 150 through the pillow cover 132.

Referring still to FIG. 13, the pillow 102 may include both the pillow massage system 150 and the pillow heating element 156. According to an example embodiment, the pillow 102 includes all of the first audio system 118, the second audio system 120, the pillow massage system 150, and the pillow heating element 156. According to an example embodiment, the pillow 102 includes the pillow heating element 156, the first audio system 118, and the second audio system 120, but not the pillow massage system 150. According to an example embodiment, the pillow 102 includes the pillow massage system 150, the first audio system 118, and the second audio system 120, but not the pillow heating element 156. The pillow 102 may include any combination of the first audio system 118, the second audio system 120, the pillow heating element 156, and the pillow massage system 150.

Figure 14:
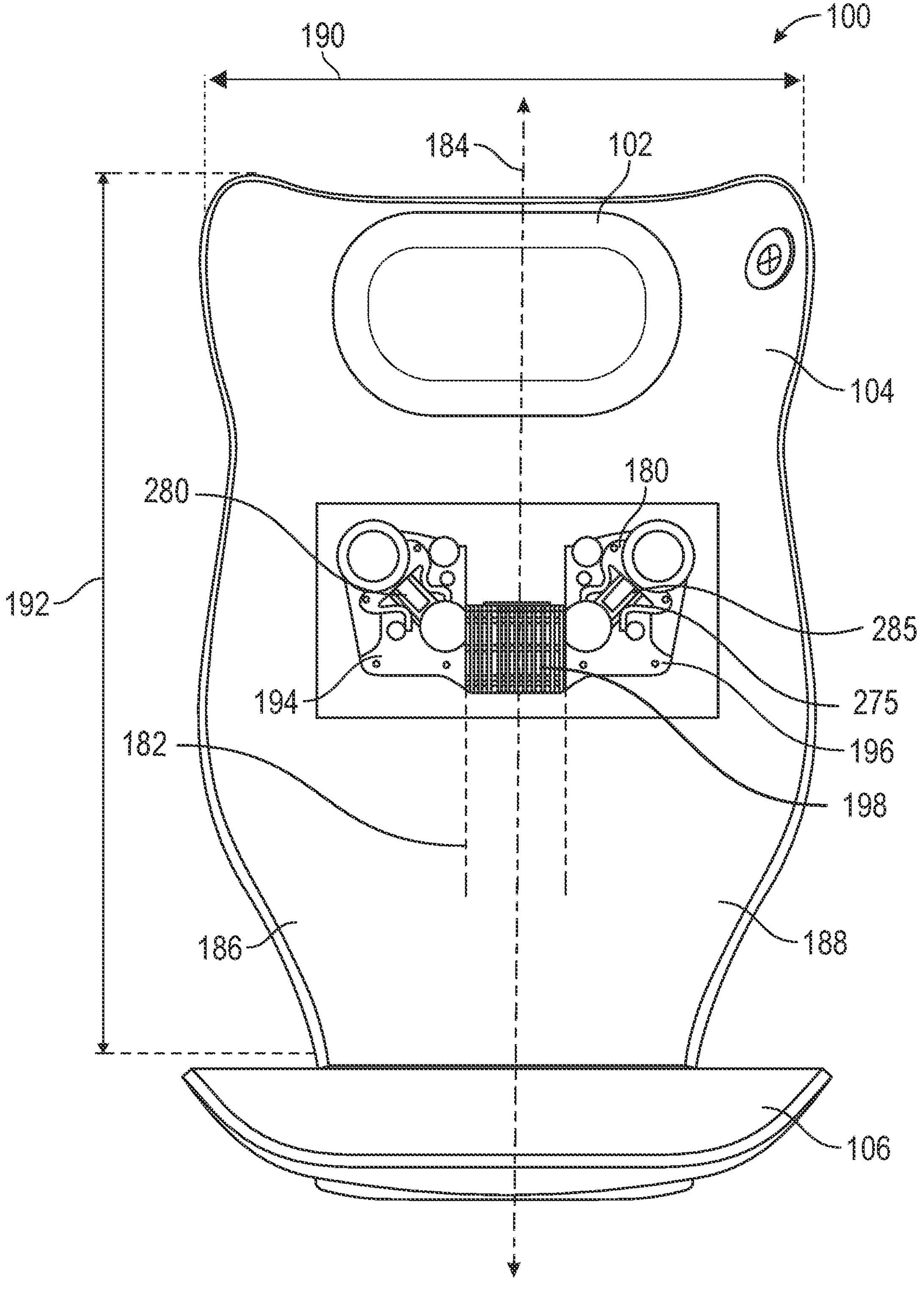
FIG. 14 is a front view of the hydrotherapy module of FIG. 1, showing the back massage system, according to an example embodiment.

Referring now to FIG. 14, a front view of the back support module 104 of FIG. 1 is shown. The back support module 104 further includes a back massage system 180. The back massage system 180 is coupled to the back support module 104 by a track 182 disposed within. The track 182 is aligned along a vertical axis 184 of the back support module 104 and is configured to allow a vertical direction of travel of the back massage system 180. The vertical axis 184 is further defined to be at the central axis of the back support module 104, where the vertical axis 184 is at an equal distance to a first support end 186 and a second support end 188. According to an example embodiment, the vertical axis 184 is not defined at the central axis of the back support module 104 (e.g., the track 182 is offset the central axis and set to be a first distance from the first support end 186 and a second distance from the second support end 188). The back support module 104 defines a support length 190, disposed perpendicular to the vertical axis 184 along the back support module 104, and a support height 192, disposed parallel to the vertical axis 184 along the back support module 104. The support length 190 is defined to be equal to the support height 192 (e.g., the support length 190 and the support height 192 are the same distance). According to an example embodiment, the support length 190 is defined to be greater than the support height 192. In still some embodiments, the support length 190 is defined to be less than the support height 192. According to an example embodiment, the back support module 104 is formed of an absorbent material so that the back support module 104 may absorb an amount of water or other fluid. According to an example embodiment, the back support module 104 is formed of a material that is less dense than water and configured to keep the back support module 104 afloat should the back support module 104 be fully submersed into a body of water (e.g., bathtub, pool etc.). To be more precise, the back support module 104 may be fully submerged into a body of water, where the body of the back support module 104 provides a level of waterproofing (e.g., 50% waterproof, 75% waterproof, 100% waterproof, etc.) such to protect internal components disposed within the back support module 104. According to an example embodiment, the back support module 104 and is configured to form an air-tight body configured to retain air within.

Referring still to FIG. 14, the back massage system 180 includes a third massage actuator 194 and a fourth massage actuator 196, disposed within the back support module 104. The third massage actuator 194 is fixedly coupled to the fourth massage actuator 196 by a skeleton 198. The third massage actuator 194 is positioned proximal to the first support end 186. The fourth massage actuator 196 is positioned proximal to the second support end 188. According to an example embodiment, the third massage actuator 194 and the fourth massage actuator 196 are both positioned proximal to the first support end 186. In still some embodiments, the third massage actuator 194 and the fourth massage actuator 196 are both positioned proximal to the second support end 188. The skeleton 198 is defined to selectively coupled to the track 182 and allow the third massage actuator 194 and the fourth massage actuator 196 to travel along the track 182. According to an example embodiment, the back massage system 180 is fixedly coupled to the back support module 104 and not configured to allow for a direction of travel along the vertical axis 184. The third massage actuator 194 and the fourth massage actuator 196 are configured to vibrate the entirety of the back support module 104. In some configurations, the third massage actuator 194 and the fourth massage actuator 196 include rollers that have a direction of travel along the support length 190.

Referring still to FIG. 14, the back support module 104 includes a heating element, warming feature, or energy feature, shown as back heating element 275. The back heating element 275 may be positioned proximate the back massage system 180. According to an example embodiment, the back heating element 275 may be integrated into the same system as the back massage system 180 so that heat may be provided through at least one of the third massage actuator 194 and the fourth massage actuator 196. The back heating element 275 may include a first heating element 280 and a second heating element 285, where the second heating element 285 is positioned opposite the first heating element 280. By way of example, the first heating element 280 may be positioned proximate the third massage actuator 194 and the second heating element 285 may be positioned proximate the fourth massage actuator 196. According to an example embodiment, the first heating element 280 may be positioned proximate the fourth massage actuator 196 and the second heating element 285 may be positioned proximate the third massage actuator 194. According to an example embodiment, the first heating element 280 and the second heating element 285 may be simultaneously actuated between an on and off position by the controller 158. According to an example embodiment, the first heating element 280 and the second heating element 285 may be individually actuated by the controller 158, where the controller 158 may selectively actuate one of the first heating element 280 and the second heating element 285. The first heating element 280 and the second heating element 285 may be configured to provide heat energy to the back of the user. To be more precise, the first heating element 280 and the second heating element 285 may be configured to transfer heat energy from the back heating element 275 to the mid-section of the user (e.g., back, torso, neck, etc.).

Figure 15:
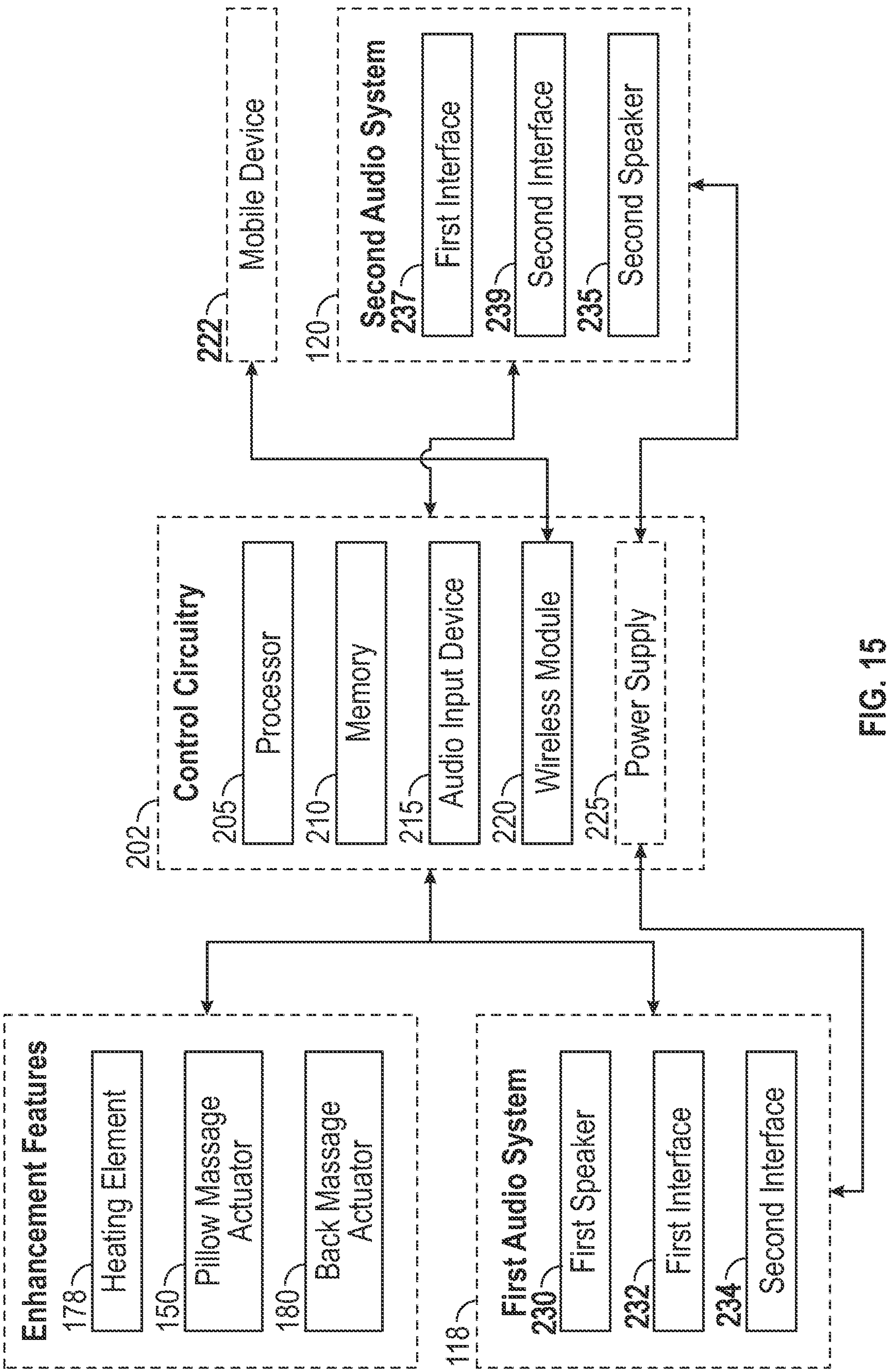
FIG. 15 is a block diagram of the control system of the hydrotherapy module of FIG. 1, according to an example embodiment.

Referring now to FIG. 15, a block diagram of a control system of the hydrotherapy module 100 is shown. The hydrotherapy module 100 includes control circuitry 202 operably coupled to the first audio system 118 and the second audio system 120. The first audio system 118 may include at least one of a first speaker 230, a first interface, and a second interface. The second audio system may include at least one of a second speaker 235, a first interface 237 and a second interface 239. The first speaker 230 and the second speaker 235 may be substantially similar, and, as such, may operate in a similar manner. Likewise, the first interface 232 and the first interface 234, as well as the second interface 234 and the second interface 239 may be substantially similar, and, as such, may operate in a similar manner. The control circuitry 202 may be positioned within the first audio system 118, the second audio system 120, the body portion 116, or any combination thereof. For example, the control circuitry 202 may be positioned within a housing overmolded within a foam cushion of the body portion 116. Specifically, the control circuitry 202 includes a processor 205, a memory 210, an audio input device 215, a wireless module 220, and a power supply 225.

The memory 210 may store machine instructions that, when executed by the processor 205, cause the processor 205 to perform one or more of computer operations. The processor 205 may include one or more microprocessors, application specific integrated circuits (ASICs), field programmable gate arrays (FPGAs), other forms of processing circuits, or combinations thereof. The memory 210 may include, but is not limited to, electronic, optical, magnetic, or any other storage or transmission device capable of providing the processor 205 with program instructions. The memory 210 may include storage devices such as a floppy disk, CD-ROM, DVD, magnetic disk, memory chip, ROM, RAM, EEPROM, EPROM, flash memory, optical media, or any other suitable memory from which the processor 205 can read instructions and/or data. The processor 205 and the memory 210 may form a processing module.

The audio input device 215 (e.g., microphone) is configured to receive an acoustic input and transmit the acoustic input to the processor 205 to be converted into a digital signal that may be transmitted via the wireless module 220. For example, the user of the pillow 102 may take phone calls, using the microphone to communicate with the party on the line. According to an example embodiment, the audio input device 215 (e.g., audio-in connector, 3.5 mm jack, etc.) is configured to receive a digital input and transmit the digital input to the processor. For example, a user may connect their MP3 player to the audio input device 215 and play their music through the first audio system 118 and the second audio system 120. According to an example embodiment, the pillow 102 includes both a microphone and an "audio-in" audio port.

The wireless module 220 is operatively coupled to the processor 205 and is configured to transmit and receive data wirelessly over a network. The operation of the network is facilitated by short and/or long-range communication technologies, such as Bluetooth® transceivers, Bluetooth® beacons, RFID transceivers, NFC transceivers, Wi-Fi transceivers, cellular transceivers, microwave transmitters, software radio, wired network connections (e.g., Ethernet), and so on. For example, the wireless module 220 may form a wireless connection with a mobile device 222 via a Bluetooth connection. The user of the mobile device 222 may transmit audio data to the processor 205 via the wireless module 220 and cause the processor 205 to play the audio on both the first audio system 118 and the second audio system 120. According to an example embodiment, such as when the user is making a phone call via the pillow 102, the wireless module 220 may receive audio information from the mobile device 222 and may transmit audio information to the mobile device 222 simultaneously and in real time. The wireless module 220 may form a connection with a plurality of mobile devices 222 at the same time such that double-tapping the third control 170 indicates to the wireless module 220 to change which of the plurality of mobile devices 222 to receive an audio signal from.

The power supply 225 is operatively coupled to the first audio system 118, the second audio system 120, and the control circuitry 202. The power supply 225 may be a central power supply positioned within the body portion 116. According to an example embodiment, the power supply 225 is decentralized such that a portion of the power supply lies with the first audio system 118 and a portion of the power supply 225 lies within the second audio system 120. The power supply 225 may be a rechargeable unit, such as a lithium ion battery, that may be recharged via a power source external to the pillow 102 (e.g., utility power, wall charger, 120V AC, etc.). According to an example embodiment, the power supply 225 is removable from the pillow 102 such that a power cell (e.g., disposable batteries) may be replaced and the power supply 225 re-attached to the pillow 102.

Figure 16:
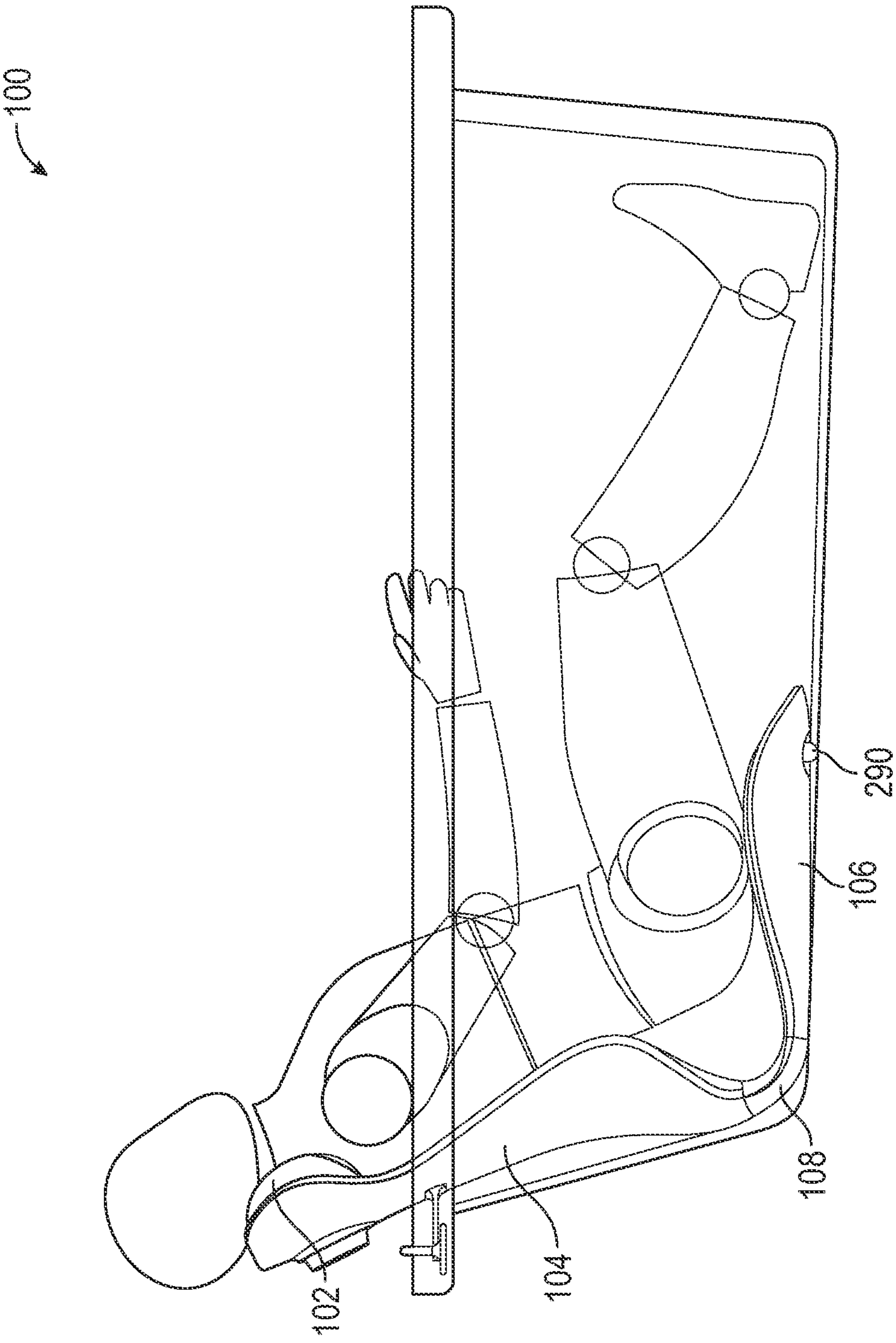
FIG. 16 is a side view of the hydrotherapy module of FIG. 1, shown in a bathing environment, according to an example embodiment.

Referring now to FIG. 16, the hydrotherapy module 100 of FIG. 1 is shown in a bathing environment, according to an example embodiment. The hydrotherapy module 100 is configured to support a user in an upright position while in a bathing environment. The pillow 102 may support the upper part of the user (e.g., head, neck, etc.), the back support module 104 is configured to support the middle part of the user (e.g., back, shoulders, etc.), and the seat support module is configured to support the lower part of the user (e.g., butt, thighs, etc.). The seat support module 106 is further configured to be telescopic along the length of the frame 108, where the seat support module 106 may be proximal or distal to the back support module 104. According to an example embodiment, the seat support module 106 is positioned proximal to the back support module 104. In still some embodiments, the seat support module 106 is positioned distal to the back support module 104.

Referring still to FIG. 16, the hydrotherapy module 100 may further include a stopper, bumper, or supporting structure, shown as stopper 290. The stopper 290 may be positioned rearward the seat support module 106 and abut the bathing environment. The stopper 290 may be manufactured out of silicone, where the silicon may be configured to at least provide support between the seat support module 106 and the bathing environment. According to an example embodiment, the stopper 290 may be positioned between the seat support module 106 and the bathing environment so that the seat support module 106 does not abut the bathing environment. According to an example embodiment, the seat support module 106 may abut the bathing environment.

Figure 17:
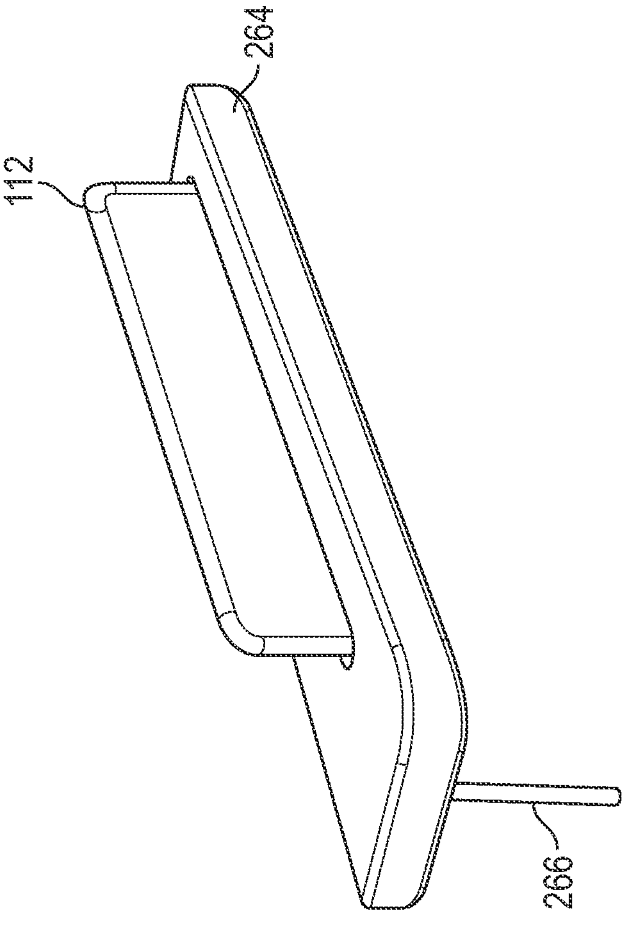
FIG. 17 is a perspective view of a charging station of the hydrotherapy module of FIG. 1, according to example embodiment.

Referring to FIG. 17, the hydrotherapy module 100 further includes a charging station 264 operable coupled to the hydrotherapy module 100. The charging station 264 is configured to be coupled to an external power source such that the hydrotherapy module 100 may be charged. According to an example embodiment, the charging station 264 may be operably coupled to the battery 113 so that the battery 113 may be charged. The charging station 264 includes a charging connector 266 coupled between the external power source and the charging station 264. The charging connector 266 may be formed of a ferrous metal such that the charging station 264 may be magnetically coupled to the charging connector 266. The charging station 264 further includes a mounting flange 112 (e.g., similar to that of FIG. 2) fixedly coupled to the charging station 264. The mounting flange 112 is configured to selectively couple the charging station 264 to the hydrotherapy module 100. According to an example embodiment, the charging station 264 is not selectively coupled to the hydrotherapy module 100 by the mounting flange 112, and instead interfaces with alternate methods (e.g., magnets, hooks, etc.). In still some embodiments, the hydrotherapy module 100 is not wirelessly linked to the charging station 264, and a charging cable is coupled between the hydrotherapy module 100 and the charging station 264.

In the charging state, the hydrotherapy module 100 is oriented substantially linear in vertical position. The seat support module 106 is rotated about the second rotational axis 262 such that the frame 108 is in a linear orientation. In the linear orientation, the seat support module 106 may be substantially parallel to the back support module 104. According to an example embodiment, the hydrotherapy module 100 is not substantially linear in the charging state. The seat support module 106 may be substantially perpendicular to the back support module 104.

According to an example embodiment, the pillow 102 includes removable speakers that may be independently charged. Specifically, the first audio system 118 and the second audio system 120 may be removably coupled to the body portion 116. The body portion 116 may include a speaker dock positioned at each of the first body end 122 and the second body end 124.

According to an example embodiment, the pillow 102 may be an individual component from the hydrotherapy module 100. In such an embodiment, the pillow 102 may include a mounting system where the pillow is selectively coupled to the bathing environment. In still such an embodiment, the pillow 102 may be configured to support an upper portion of the user (e.g., head, neck, etc.).

According to an example embodiment, the first audio system 118 includes a pair of charging leads configured to be operably coupled to a power source for charging a rechargeable power supply positioned within the first audio system 118 (e.g., the power supply 225). The first audio system 118 may be removed from the body portion 116 and charged separately from the body portion 116. According to an example embodiment, the pair of charging leads are configured to engage a similar pair of leads positioned within the body portion 116 and configured to charge the rechargeable power supply within the first audio system 118. According to an example embodiment, while the body portion 116 is charging via the charging connector 266, the first audio system 118 and the second audio system 120 may be coupled to the body portion 116 and simultaneously charged. According to an example embodiment, the first audio system 118 and the second audio system 120 may be removably coupled to the body portion 116 via a plurality of magnets (e.g., magnetic connectors).

Figure 18:
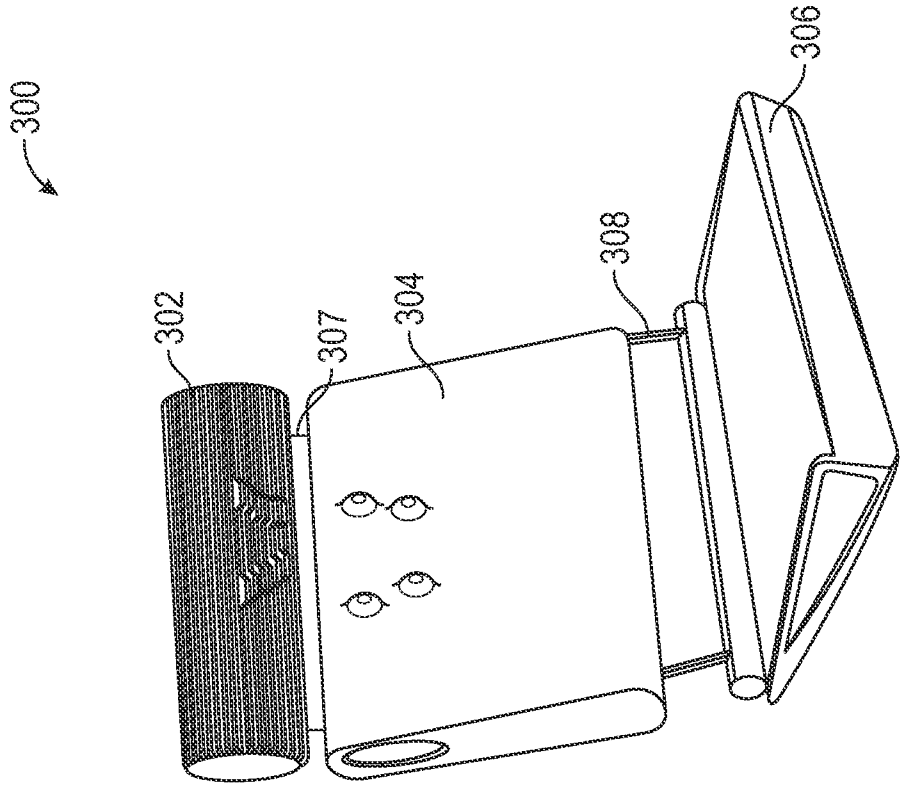
FIG. 18 is a perspective view of a hydrotherapy module, according to an example embodiment.

Referring generally to FIGS. 18-21, a hydrotherapy module 300 is shown, according to an example embodiment. The hydrotherapy module 300 is substantially similar to the hydrotherapy module 100 such that similar components may be used to describe the hydrotherapy module 300. Referring specifically to FIG. 18, the hydrotherapy module 300 includes a pillow 302, a back support module 304, and a seat support module 306. The pillow 302 is selectively coupled to the back support module 304 by a support stand 307. The back support module 304 is selectively coupled to the seat support module 306 by a frame 308. The frame 308 extends through the length of the back support module 304 and the seat support module 306, such that the frame 308 provides support to the hydrotherapy module 300. According to an example embodiment, the frame 308 does not extend through the length of the back support module 304 and the seat support module 306. In still some embodiments, the frame 308 extends through at least one of the back support module 304 and the seat support module 306. In still other embodiments, the frame extends through the length of the pillow 302. The hydrotherapy module 300 is configured to be positioned along a sidewall in a bathing environment (e.g. a bathtub, whirlpool, etc.). According to an example embodiment, the hydrotherapy module 300 is positioned along a plurality of sidewalls. In still some embodiments, the hydrotherapy module 300 is not positioned along a sidewall.

Referring still to FIG. 18, the seat support module 306 is defined to be a telescoping module. For example, the seat support module 306 may translate along the length of the frame 308. This allows the seat support module 306 to be extended or retracted to fit the needs of the user. According to an example embodiment, the seat support module 306 may be fully extended to support a user who is tall or may sit lower in the bathing environment. In still some embodiments, the seat support module 306 may be fully retracted to support a user who is short or may want to sit higher in the bathing environment.

The hydrotherapy module 300 may be reconfigurable to include different combinations of the various modules, such to create a custom hydrotherapy module 300. As shown, the hydrotherapy module 300 comprises the pillow 302, the back support module 304, and the seat support module 306. According to an example embodiment, the hydrotherapy module 300 may only include the pillow 302 and the back support module 304, but not the seat support module 306. In still some embodiments, the hydrotherapy module 300 may only include the pillow 302 and the seat support module 306, but not the back support module 304. In still some embodiments, the hydrotherapy module 300 may only include the back support module 304 and the seat support module 106, but not the pillow 302. The hydrotherapy module 300 may include any combination of the pillow 302, the back support module 304, and the seat support module 306.

Figure 19:
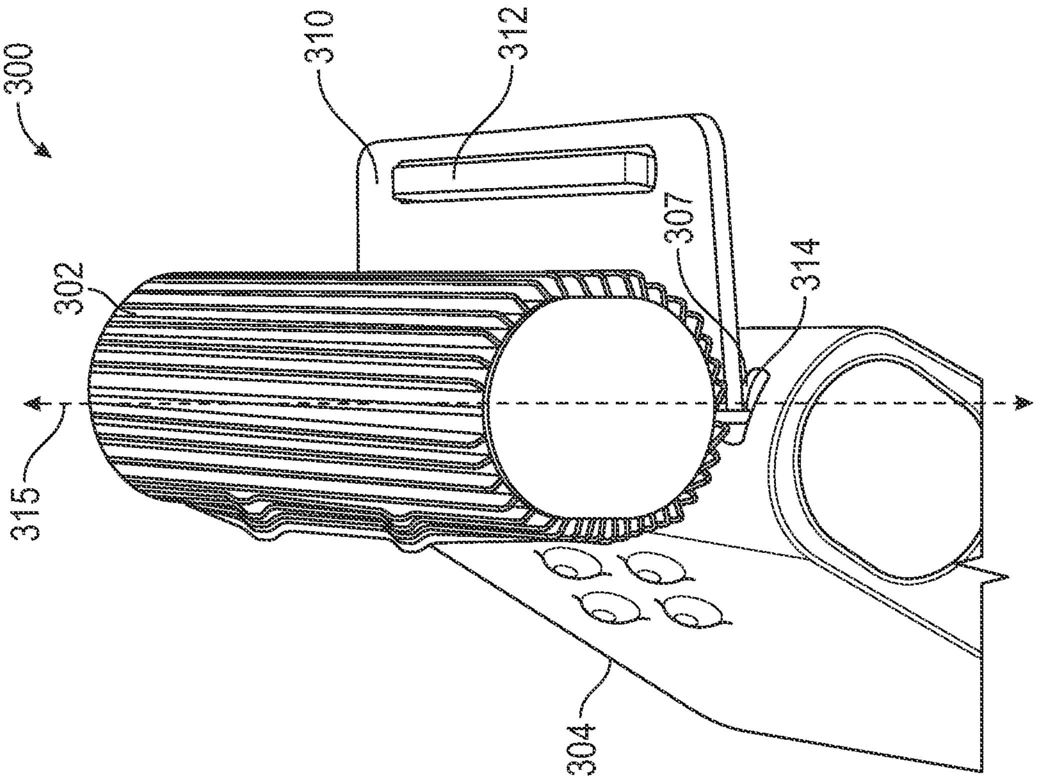
FIG. 19 is a top, perspective view of a portion of the hydrotherapy module of FIG. 18, according to an example embodiment.

Referring to FIG. 19, a perspective view of a portion of the hydrotherapy module 300 is shown according to an example embodiment. The hydrotherapy module 300 includes a support structure, shown as mounting system 310. The mounting system 310 is configured to couple the hydrotherapy module 300 to the bathing environment with an interface, shown as mounting flange 312. The mounting system 310 is coupled to the support stand 307. According to an example embodiment, the mounting system 310 is coupled to the pillow 302. In still some embodiments, the mounting system 310 is coupled to the back support module 304. The support stand 307 includes an interface, shown as support interface 314. The support interface 314 pivotally couples the back support module 304 to the support stand 307. The support interface 314 is configured to pivot about an axis, shown as rotational axis 315, of the back support module 304. The support interface 314 defines a single direction of travel about the rotational axis 315. According to an example embodiment, the support interface defines additional directions of travel about the rotational axis 315. The support interface 314 positions the back support module 304 along a sidewall in the bathing environment. The support interface 314 maintains a substantially parallel orientation between the back support module 304 and the sidewall in the bathing environment. According to an example embodiment, the support interface 314 positions the back support module 304 along a plurality of sidewalls in the bathing environment.

Figure 20:
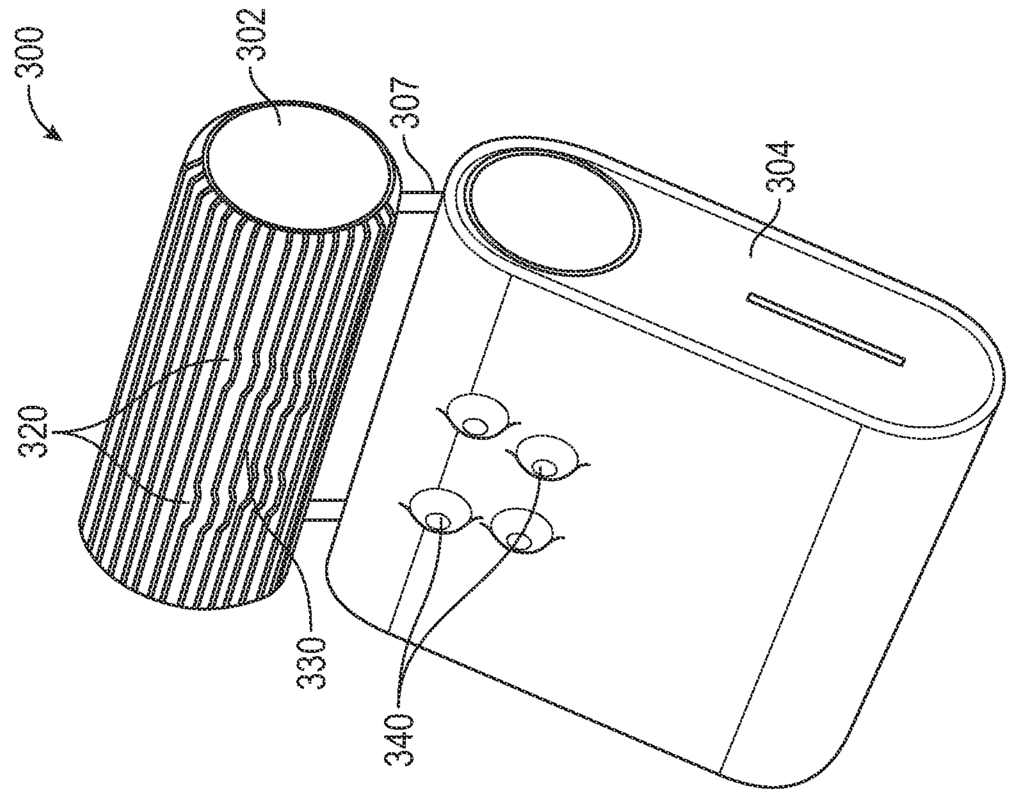
FIG. 20 is a perspective view of a portion of the hydrotherapy module of FIG. 18, according to an example embodiment.

Referring still to FIG. 20, the pillow 302 further includes a massage system, shown as pillow massage system 320. The pillow massage system 320 is configured to vibrate the entirety of the pillow 302. The pillow massage system 320 may include a first massage actuator and a second massage actuator. The first massage actuator may be positioned opposite the second massage actuator within the pillow 302. The pillow 102 further a warming element, shown as pillow heating element 330. The pillow heating element 330 may be configured to provide heat energy to the pillow 302. The pillow heating element 330 may be positioned between the first massage actuator and the second massage actuator a midpoint of the pillow 302.

Referring still to FIG. 20, the back support module 304 further includes a back massage system 340. According to an example embodiment, the back support module 304 is formed of an absorbent material so that the back support module 304 may absorb an amount of water or other fluid. According to an example embodiment, the back support module 304 is formed of a material that is less dense than water and configured to keep the back support module 304 afloat should the back support module 304 be fully submersed into a body of water (e.g., bathtub, pool etc.). According to an example embodiment, the back support module 304 and is configured to form an air-tight body configured to retain air within. The back massage system 340 includes a third massage actuator and a fourth massage actuator, disposed within the back support module 304. The third massage actuator may be fixedly coupled to the fourth massage actuator by a frame. The third massage actuator may be positioned proximate a first side of the back support module 304. The fourth massage actuator may be positioned proximate a second side of the back support module 304, where the second side is opposite the first side. According to an example embodiment, the third massage actuator and the fourth massage actuator are both positioned proximate the first side. In still some embodiments, the third massage actuator and the fourth massage actuator are both positioned proximate the second side. The third massage actuator and the fourth massage actuator are configured to vibrate the entirety of the back support module 304. In some configurations, the third massage actuator and the fourth massage actuator include rollers that have a direction of travel along at least a portion of the length of the back support module 304.

Figure 21:
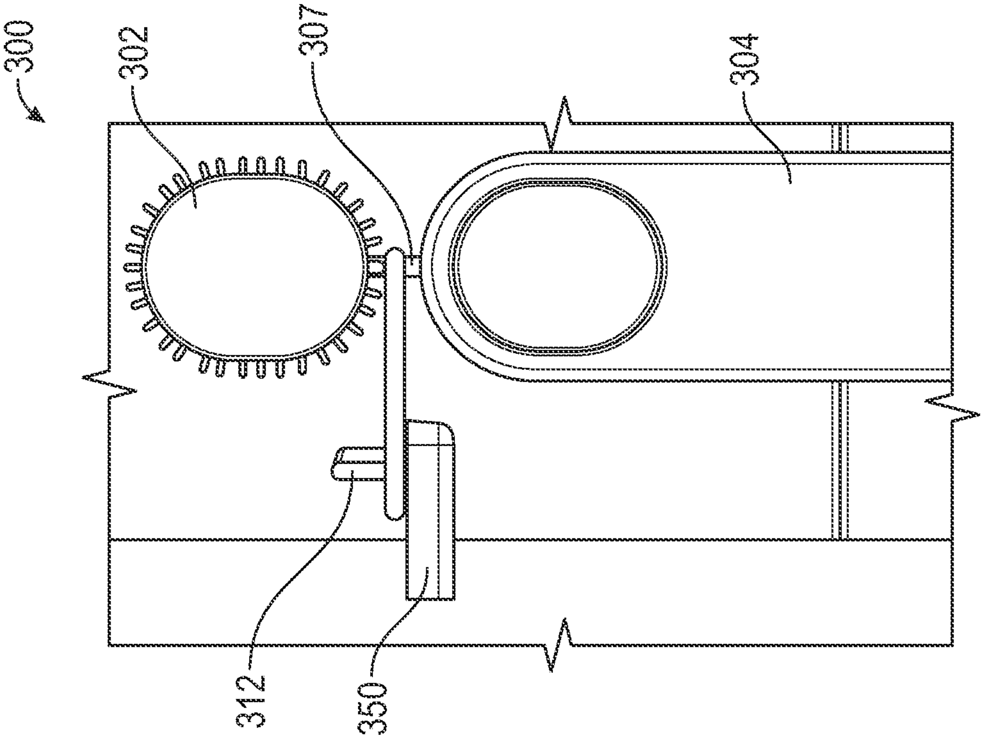
FIG. 21 is a side view of a portion of the hydrotherapy module of FIG. 18, mounted onto a charging station, according to an example embodiment.

Turning now to FIG. 21, a detailed, side view of a charging station 350 is shown. As shown, the hydrotherapy module 300 is selectively coupled to the charging station 350 by the charging station 350 receiving the hydrotherapy module 300. A linear movement may selectively couple the hydrotherapy module 300 to the charging station 350 with a mounting flange 312. The linear movement interacts the mounting flange 312 through a slot (e.g., hole, square, etc.). When the mounting flange 312 is engaged through the hydrotherapy module 300, the hydrotherapy module 300 is coupled to the charging station 350, where the mounting flange 312 provides increased support. According to an example embodiment, the hydrotherapy module 300 may not be selectively coupled to the charging station 350, where the mounting flange 312 is not engaged through the slot of the hydrotherapy module 300.

Referring still to FIG. 21, in the charging state, the hydrotherapy module 300 is oriented substantially linear in vertical position. The seat support module 306, although not shown in FIG. 21, is rotated about a rotational axis such that the frame 308 is in a linear orientation. In the linear orientation, the seat support module 306 may be substantially parallel to the back support module 304. According to an example embodiment, the hydrotherapy module 300 is not substantially linear in the charging state. The seat support module 306 may be substantially perpendicular to the back support module 304.

Figure 22:
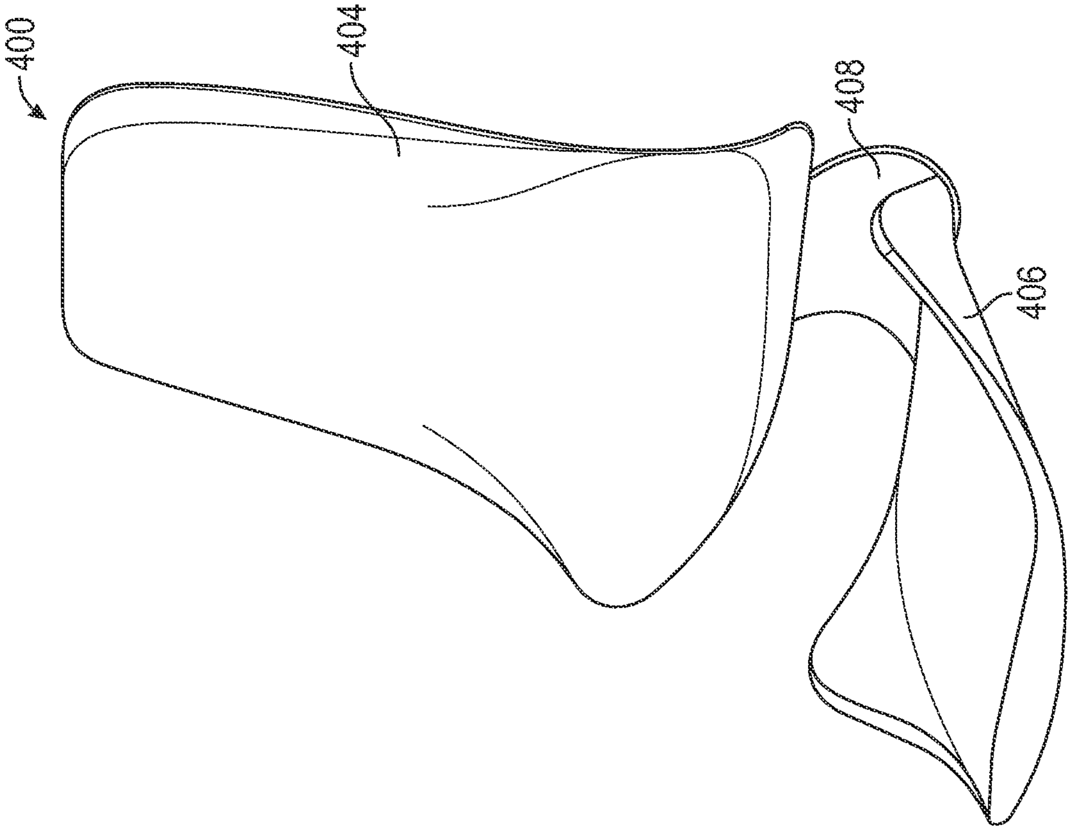
FIG. 22 is a perspective view of a hydrotherapy module, according to an example embodiment.

Referring now to FIG. 22, a hydrotherapy module 400 is shown, according to another example embodiment. The hydrotherapy module 400 is substantially similar to the hydrotherapy module 100 such that similar components may be used to describe the hydrotherapy module 400. According to an example embodiment, the hydrotherapy module 400 may include any of the features of hydrotherapy module 100 and 300 (e.g., back massage system, back heating element, audio system, etc.). The hydrotherapy module 400 includes a back support module 404 and a seat support module 406. The back support module 404 may be fixedly coupled to the seat support module 406 by a frame 408. The frame 408 may be fixedly coupled to at least one of an end of the back support module 404 and an end of the seat support module 406. According to an example embodiment, the frame 408 may extend through at least one of a length of the back support module 404 and a length of the seat support module 406. The seat support module 406 may have a curved geometry. To be more precise, the seat support module 406 may have a first curved portion and a second curved portion, where the second curved portion is fixedly coupled to the seat support module 406 opposite the first curved portion. The first curved portion and the second curved portion may be configured to provide at least one of support to the user and prevent side to side movement of the user when the hydrotherapy module 400 is in the bathing environment.

Figure 23:
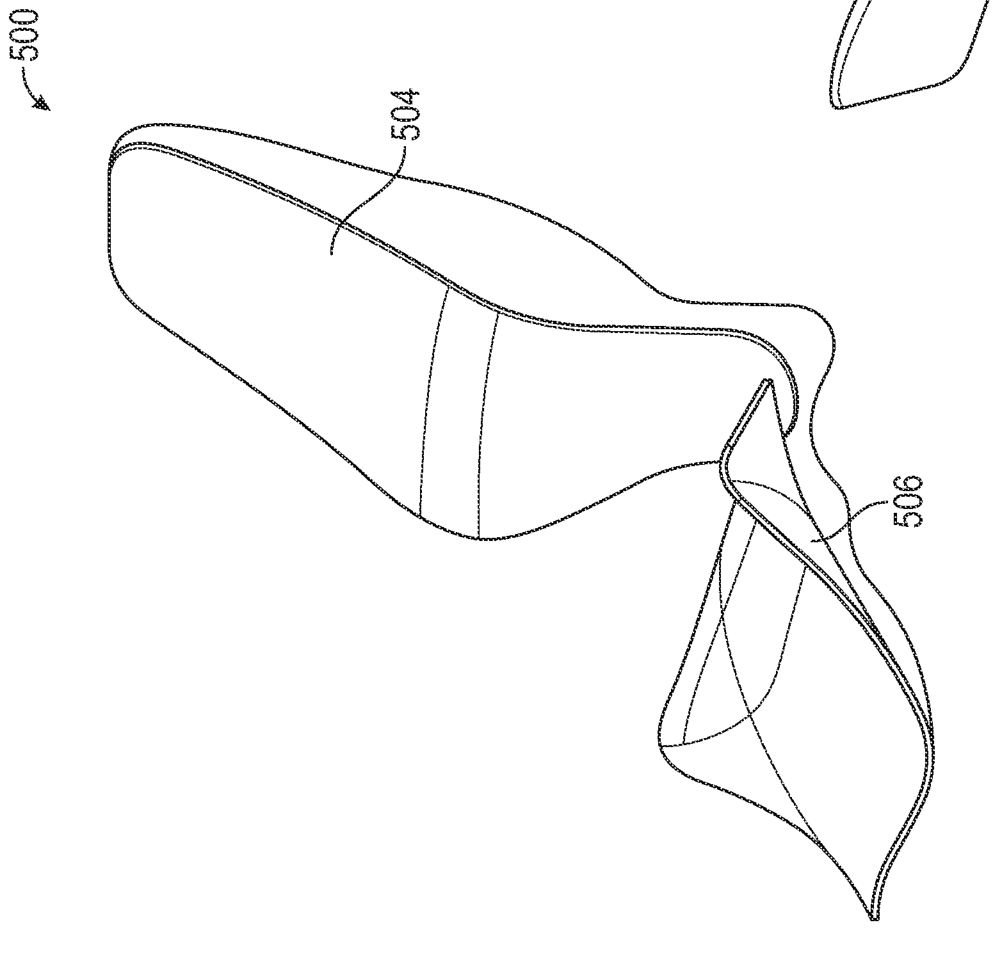
FIG. 23 is a perspective view of a hydrotherapy module, according to an example embodiment.

Referring now to FIG. 23, a hydrotherapy module 500 is shown, according to another example embodiment. The hydrotherapy module 500 is substantially similar to the hydrotherapy module 100 such that similar components may be used to describe the hydrotherapy module 500. According to an example embodiment, the hydrotherapy module 500 may include any of the features of hydrotherapy module 100, 300 and 400 (e.g., back massage system, back heating element, audio system, etc.). The hydrotherapy module 500 includes a back support module 504 and a seat support module 506. The seat support module 506 may have a curved geometry. To be more precise, the seat support module 506 may have a first curved portion and a second curved portion, where the second curved portion is fixedly coupled to the seat support module 506 opposite the first curved portion. The first curved portion and the second curved portion may be configured to provide at least one of support to the user and prevent side to side movement of the user when the hydrotherapy module 500 is in the bathing environment. Additionally, the seat support module 506 may include a third curved portion extending along a midpoint of the seat support module 506. The third curved portion may be configured to support a lower portion of the user (e.g., between the user's legs, etc.).

Figure 24:
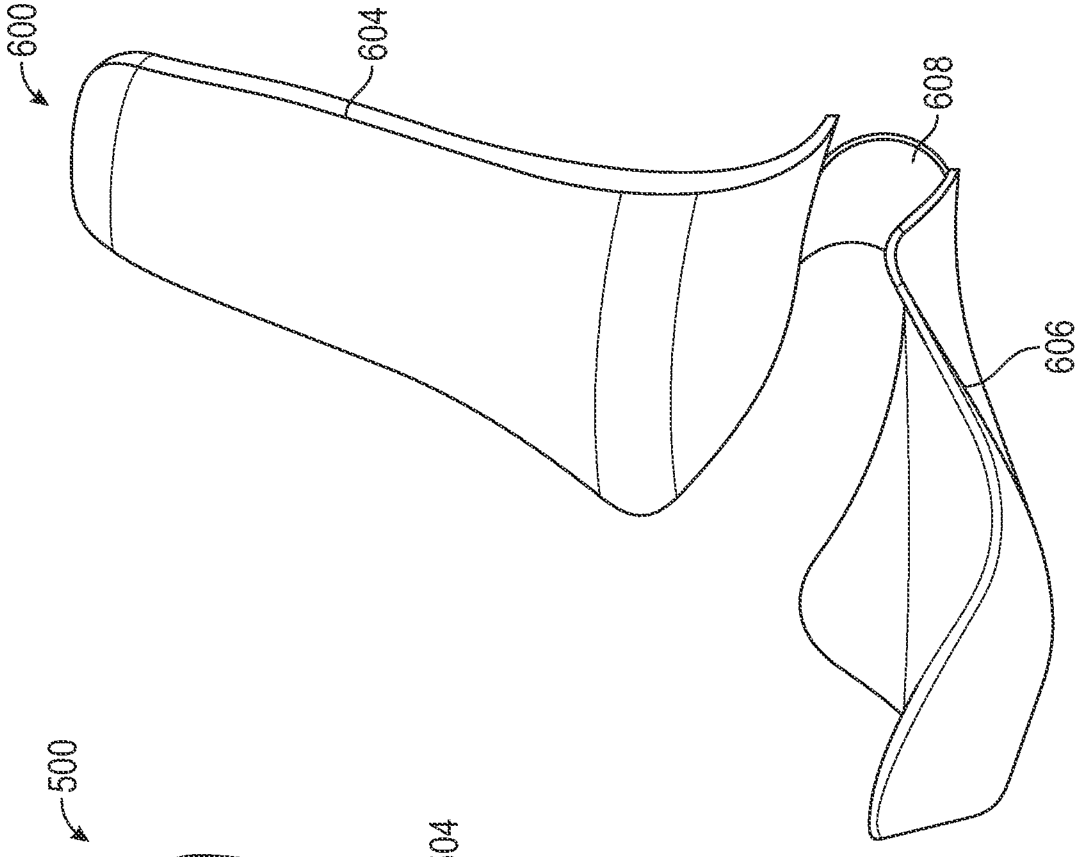
FIG. 24 is a perspective view of a hydrotherapy module, according to an example embodiment.

Referring now to FIG. 24, a hydrotherapy module 600 is shown, according to another example embodiment. The hydrotherapy module 600 is substantially similar to the hydrotherapy module 100 such that similar components may be used to describe the hydrotherapy module 600. According to an example embodiment, the hydrotherapy module 600 may include any of the features of hydrotherapy module 100, 300, 400, and 500 (e.g., back massage system, back heating element, audio system, etc.). The hydrotherapy module 600 includes a back support module 604 and a seat support module 606. The back support module 604 may be fixedly coupled to the seat support module 606 by a frame 608. The frame 608 may be fixedly coupled to at least one of an end of the back support module 604 and an end of the seat support module 606. According to an example embodiment, the frame 608 may extend through at least one of a length of the back support module 604 and a length of the seat support module 606. The seat support module 606 may have a curved geometry. To be more precise, the seat support module 606 may have a first curved portion and a second curved portion, where the second curved portion is fixedly coupled to the seat support module 606 opposite the first curved portion. The first curved portion and the second curved portion may be configured to provide at least one of support to the user and prevent side to side movement of the user when the hydrotherapy module 600 is in the bathing environment. Additionally, the seat support module 606 may include a third curved portion extending along a midpoint of the seat support module 606. The third curved portion may be configured to support a lower portion of the user (e.g., between the user's legs, etc.).

Figure 25:
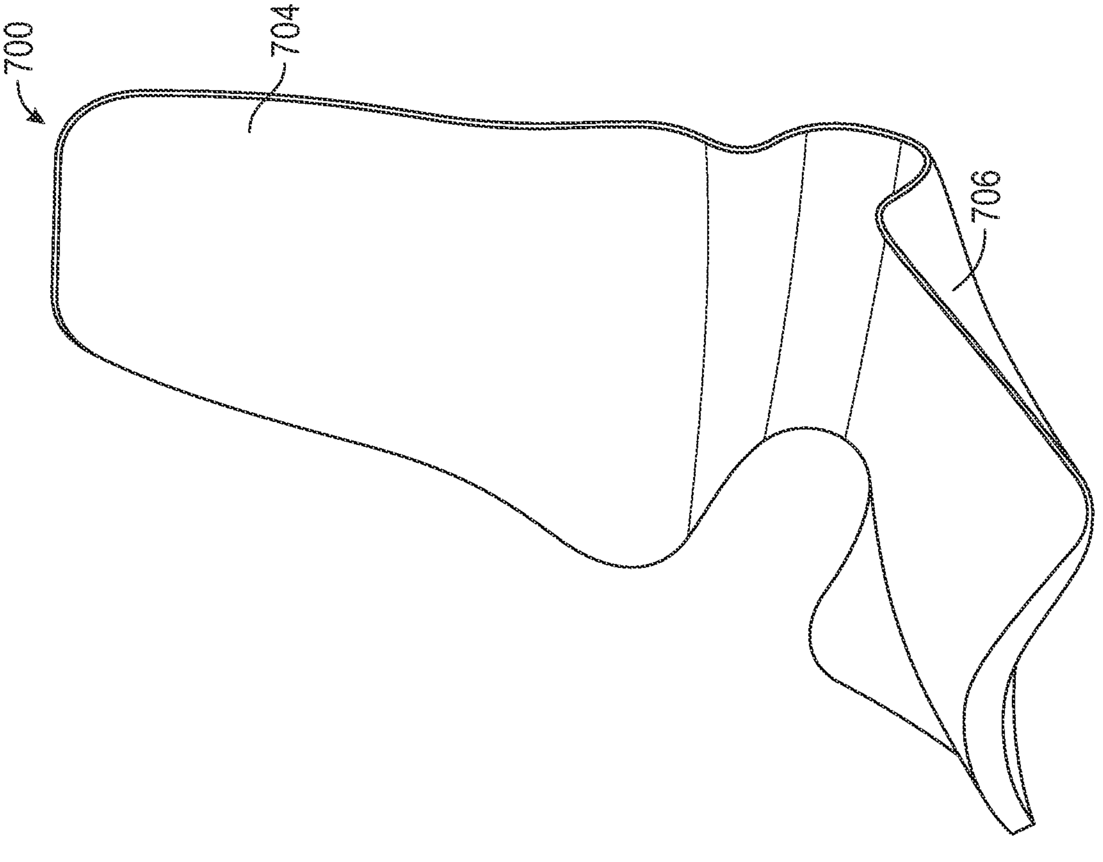
FIG. 25 is a perspective view of a hydrotherapy module, according to an example embodiment.

Referring now to FIG. 25, a hydrotherapy module 700 is shown, according to another example embodiment. The hydrotherapy module 700 is substantially similar to the hydrotherapy module 100 such that similar components may be used to describe the hydrotherapy module 700. According to an example embodiment, the hydrotherapy module 700 may include any of the features of hydrotherapy module 100, 300, 400, 500, and 600 (e.g., back massage system, back heating element, audio system, etc.). The hydrotherapy module 700 includes a back support module 704 and a seat support module 706. The seat support module 706 may have a curved geometry. To be more precise, the seat support module 706 may have a first curved portion and a second curved portion, where the second curved portion is fixedly coupled to the seat support module 706 opposite the first curved portion. The first curved portion and the second curved portion may be configured to provide at least one of support to the user and prevent side to side movement of the user when the hydrotherapy module 700 is in the bathing environment. Additionally, the seat support module 706 may include a third curved portion extending along a midpoint of the seat support module 706. The third curved portion may be configured to support a lower portion of the user (e.g., between the user's legs, etc.).

Figure 26:
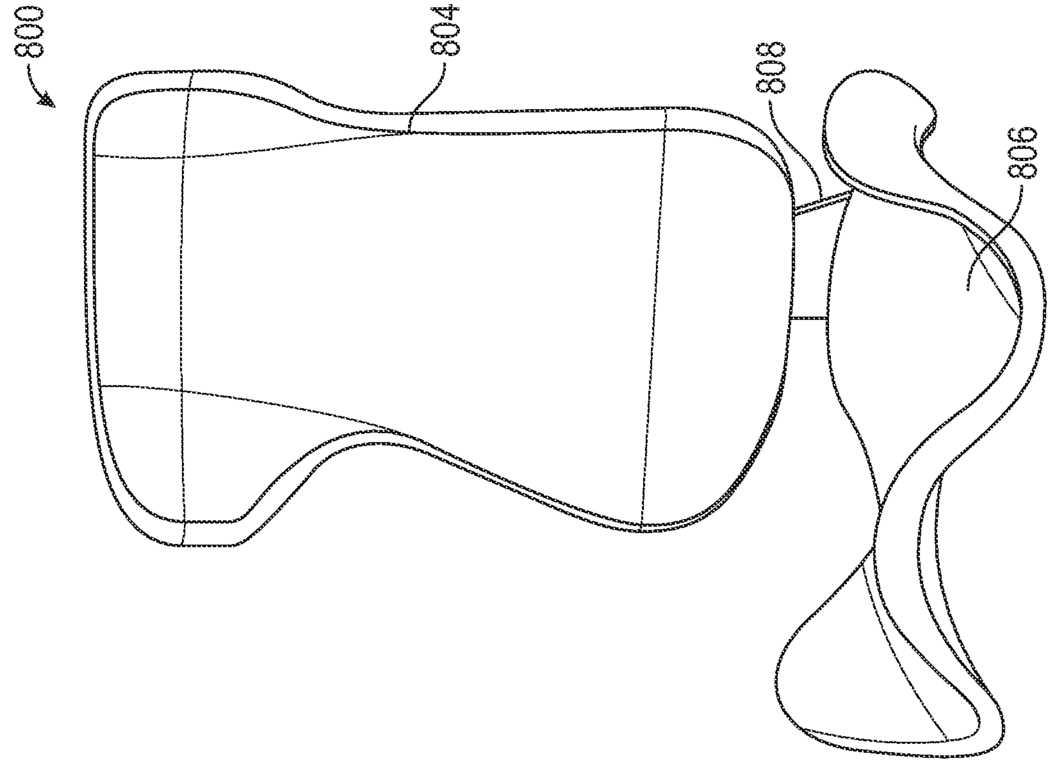
FIG. 26 is a perspective view of a hydrotherapy module, according to an example embodiment.

Referring now to FIG. 26, a hydrotherapy module 800 is shown, according to another example embodiment. The hydrotherapy module 800 is substantially similar to the hydrotherapy module 100 such that similar components may be used to describe the hydrotherapy module 800. According to an example embodiment, the hydrotherapy module 800 may include any of the features of hydrotherapy module 100, 300, 400, 500, 600, and 700 (e.g., back massage system, back heating element, audio system, etc.). The hydrotherapy module 800 includes a back support module 804 and a seat support module 806. The back support module 804 may be fixedly coupled to the seat support module 806 by a frame 808. The frame 808 may be fixedly coupled to at least one of an end of the back support module 804 and an end of the seat support module 806. According to an example embodiment, the frame 808 may extend through at least one of a length of the back support module 804 and a length of the seat support module 806. The back support module 804 may have a curved geometry. To be more precise, the back support module 804 may have a first curved portion and a second curved portion, where the second curved portion is fixedly coupled to the back support module 804 opposite the first curved portion. The first curved portion and the second curved portion may be configured to at least provide support to the user's upper body (e.g., head, etc.). The seat support module 806 may have a curved geometry. To be more precise, the seat support module 806 may have a third curved portion and a fourth curved portion, where the fourth curved portion is fixedly coupled to the seat support module 806 opposite the third curved portion. The third curved portion and the fourth curved portion may be configured to provide at least one of support to the user and prevent side to side movement of the user when the hydrotherapy module 800 is in the bathing environment. Additionally, the seat support module 806 may include a fifth curved portion extending along a midpoint of the seat support module 806. The fifth curved portion 806 may be configured to support a lower portion of the user (e.g., between the user's legs, etc.).

Figure 27:
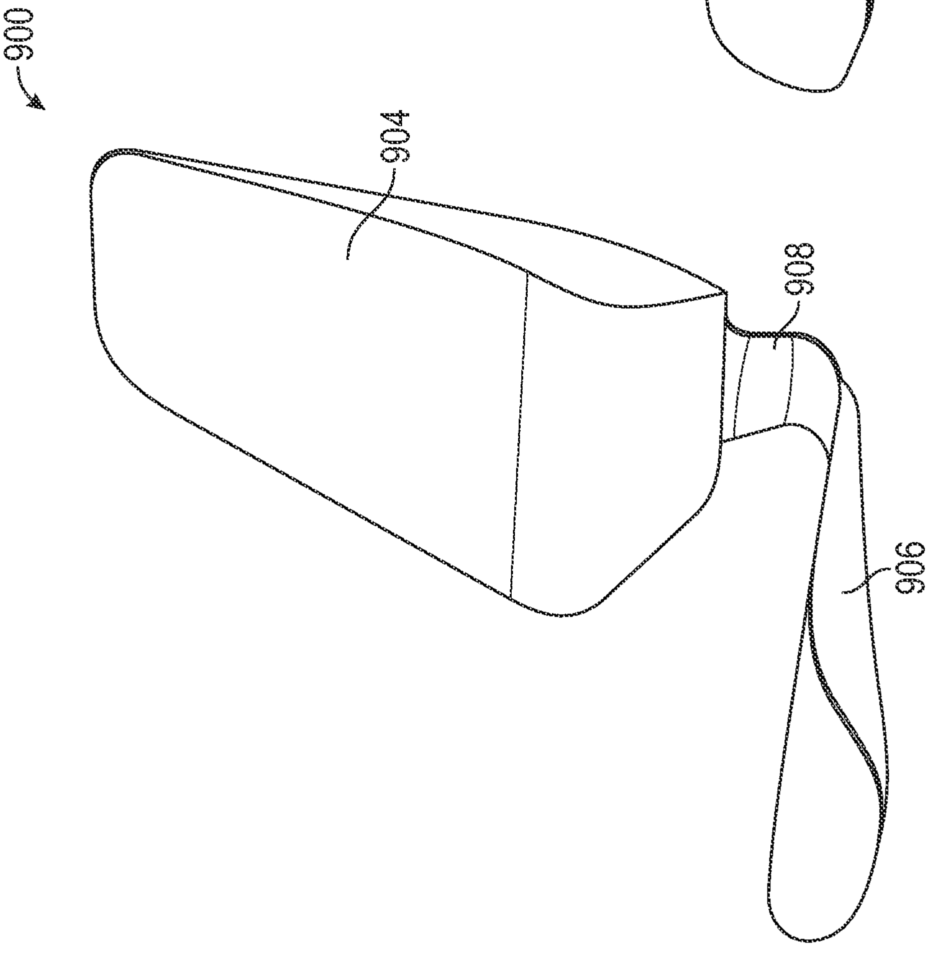
FIG. 27 is a perspective view of a hydrotherapy module, according to an example embodiment.

Referring now to FIG. 27, a hydrotherapy module 900 is shown, according to another example embodiment. The hydrotherapy module 900 is substantially similar to the hydrotherapy module 100 such that similar components may be used to describe the hydrotherapy module 900. According to an example embodiment, the hydrotherapy module 900 may include any of the features of hydrotherapy module 100, 300, 400, 500, 600, 700, and 800 (e.g., back massage system, back heating element, audio system, etc.). The hydrotherapy module 900 includes a back support module 904 and a seat support module 906. The back support module 904 may be fixedly coupled to the seat support module 906 by a frame 908. The frame 908 may be fixedly coupled to at least one of an end of the back support module 904 and an end of the seat support module 906. According to an example embodiment, the frame 908 may extend through at least one of a length of the back support module 904 and a length of the seat support module 906. The seat support module 906 may have a curved geometry. To be more precise, the seat support module 906 may have a first curved portion and a second curved portion, where the second curved portion is fixedly coupled to the seat support module 906 opposite the first curved portion. The first curved portion and the second curved portion may be configured to provide at least one of support to the user and prevent side to side movement of the user when the hydrotherapy module 900 is in the bathing environment.

Figure 28:
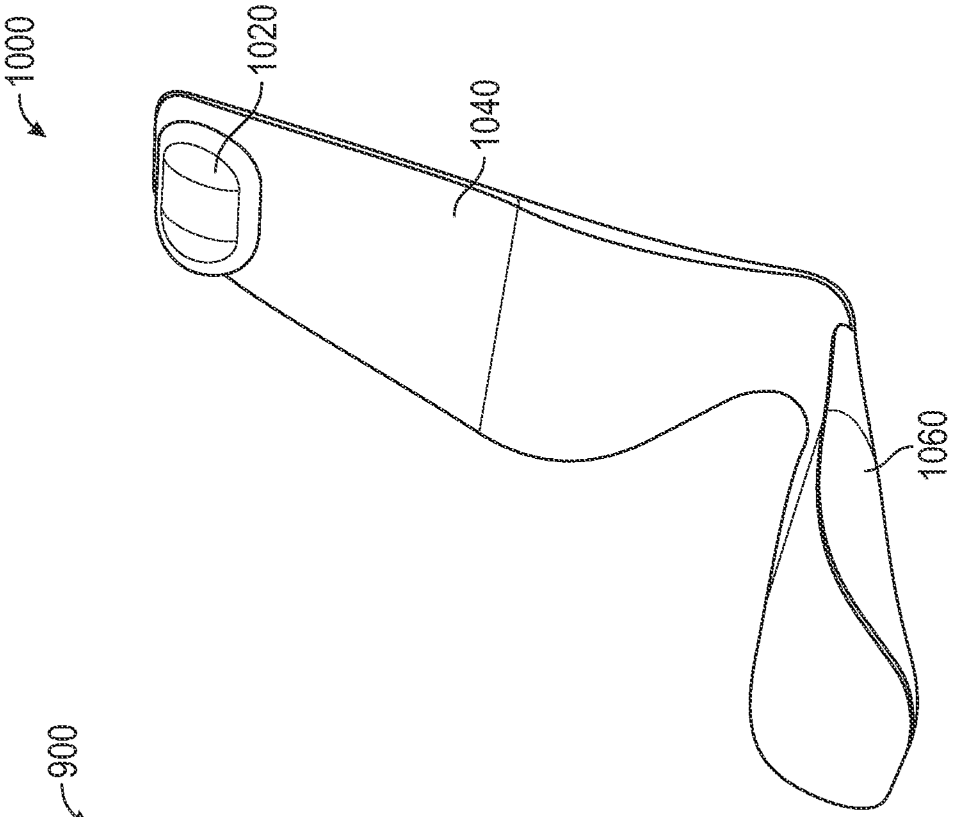
FIG. 28 is a perspective view of a hydrotherapy module, according to an example embodiment.

Referring now to FIG. 28, a hydrotherapy module 1000 is shown, according to another example embodiment. The hydrotherapy module 1000 is substantially similar to the hydrotherapy module 100 such that similar components may be used to describe the hydrotherapy module 1000. According to an example embodiment, the hydrotherapy module 1000 may include any of the features of hydrotherapy module 100, 300, 400, 500, 600, 700, 800, and 900 (e.g., pillow massage system, pillow heating element, back massage system, back heating element, audio system, etc.). The hydrotherapy module 1000 includes a pillow 1020, a back support module 1040 and a seat support module 1060. The pillow 1020 may be coupled to the back support module 1040 proximate the top of the hydrotherapy module 1000. The seat support module 1060 may have a curved geometry. To be more precise, the seat support module 1006 may have a first curved portion and a second curved portion, where the second curved portion is fixedly coupled to the seat support module 1060 opposite the first curved portion. The first curved portion and the second curved portion may be configured to provide at least one of support to the user and prevent side to side movement of the user when the hydrotherapy module 1000 is in the bathing environment.

Figure 29:
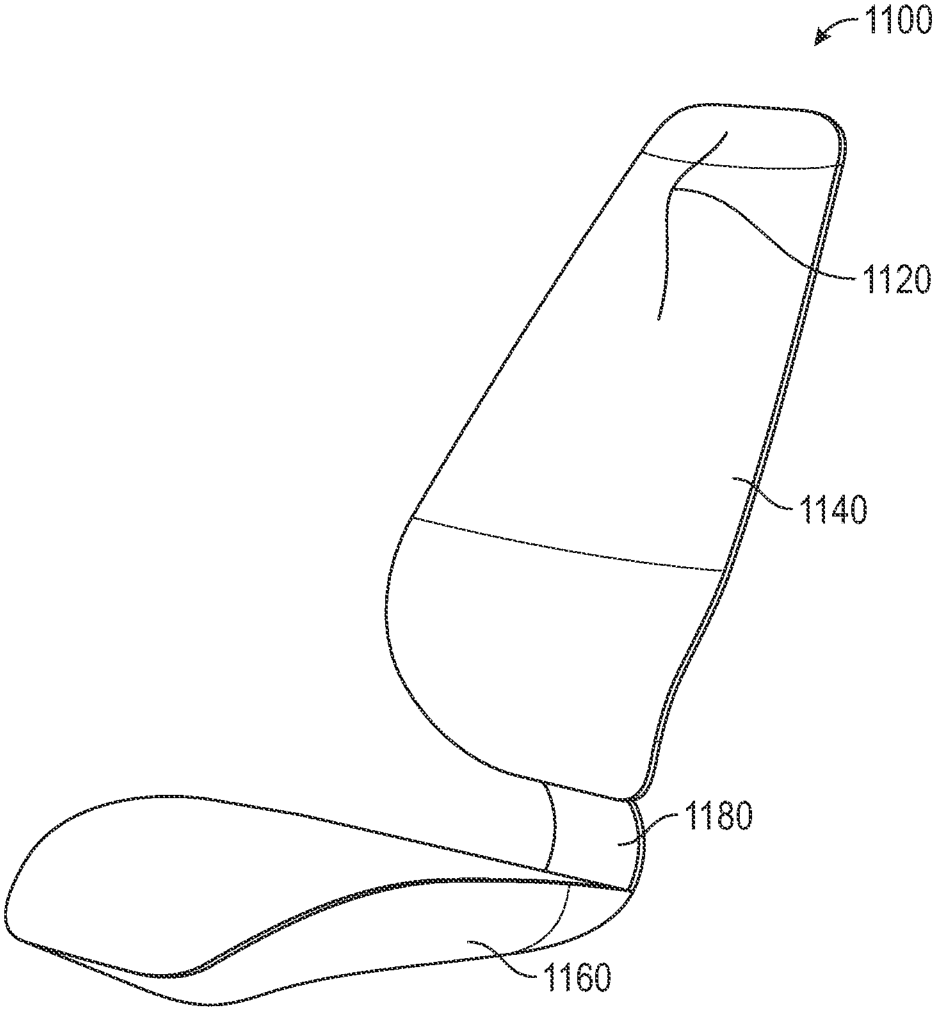
FIG. 29 is a perspective view of a hydrotherapy module, according to an example embodiment.

Referring now to FIG. 29, a hydrotherapy module 1100 is shown, according to another example embodiment. The hydrotherapy module 1100 is substantially similar to the hydrotherapy module 100 such that similar components may be used to describe the hydrotherapy module 1100. According to an example embodiment, the hydrotherapy module 1100 may include any of the features of hydrotherapy module 100, 300, 400, 500, 600, 700, 800, 900, and 1000 (e.g., pillow massage system, pillow heating element, back massage system, back heating element, audio system, etc.). The hydrotherapy module 1100 includes a pillow 1120, a back support module 1140 and a seat support module 1160. The pillow 1120 may be coupled to the back support module 1140 proximate the top of the hydrotherapy module 1100. The back support module 1140 may be fixedly coupled to the seat support module 1160 by a frame 1180. The frame 1180 may be fixedly coupled to at least one of an end of the back support module 1140 and an end of the seat support module 1160. According to an example embodiment, the frame 908 may extend through at least one of a length of the back support module 1140 and a length of the seat support module 1160. The seat support module 1160 may have a curved geometry. To be more precise, the seat support module 1160 may have a first curved portion and a second curved portion, where the second curved portion is fixedly coupled to the seat support module 1160 opposite the first curved portion. The first curved portion and the second curved portion may be configured to provide at least one of support to the user and prevent side to side movement of the user when the hydrotherapy module 1100 is in the bathing environment.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "example" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other example embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. According to an example embodiment, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the pillow heating element 156 and the pillow massage system 150 of the example embodiment described with reference to FIGS. 1-17 may be incorporated into the pillow 302 of the example embodiment described with reference to FIGS. 18-21, or combined with any of the other embodiments described with reference to FIGS. 22-29. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A bath massage chair configured to be removably coupled to a bathtub and at least partially submerged in water within the bathtub when in use, the bath massage chair comprising:

a pillow configured to support a head or neck of a user when the user is seated in the bath massage chair, the pillow comprising:
- a pillow massage system configured to massage the head or neck of the user; and
- a pillow heating element configured to heat the pillow;
- a back support configured to support a torso of the user when the user is seated in the bath massage chair, the back support comprising:
- an upper portion coupled to the pillow and a lower portion opposite the upper portion;
- a back massage system configured to massage the torso of the user; and
- a back heating element configured to heat the back support;

a mounting assembly comprising:
- a mounting system fixedly coupled to a rear surface of the back support, the mounting system including a slot positioned therein; and
- a mounting bracket configured to releasably attach to a surface of the bathtub, the mounting bracket including a mounting flange configured to fit within the slot;
- wherein the mounting system is configured to receive the mounting flange to selectively couple the bath massage chair to the bathtub, a seat coupled to the lower portion of the back support, extending substantially perpendicular to the back support, and configured to support a lower body of the user when the user is seated in the bath massage chair; and a controller operably coupled to the pillow massage system, the pillow heating element, the back massage system, and the back heating element and configured to control the pillow massage system, the pillow heating element, the back massage system, and the back heating element.

2. The bath massage chair of claim 1, wherein the pillow further comprises an audio system configured to output sound through a speaker, the speaker coupled to the back support, and the audio system operably coupled to the controller.

3. The bath massage chair of claim 2, wherein the audio system comprises a first audio system and a second audio system; and wherein the first audio system is positioned opposite the second audio system along a horizontal axis of the pillow.

4. The bath massage chair of claim 1, further comprising a track extending along a longitudinal axis of the back support between the upper portion and the lower portion of the back support.

5. The bath massage chair of claim 1, wherein the pillow massage system comprises a first massage actuator and a second massage actuator, the first massage actuator positioned opposite the second massage actuator along a horizontal axis of the pillow.

6. The bath massage chair of claim 1, wherein the back massage system comprises a third massage actuator and a fourth massage actuator coupled to one another by a skeleton, the third massage actuator positioned opposite the fourth massage actuator.

7. The bath massage chair of claim 1, the back support further comprising a battery configured to provide power to the bath massage chair.

8. The bath massage chair of claim 1, wherein the seat comprises a bumper positioned proximate an end of the seat, the bumper configured to abut a horizontal surface of the bathtub when the bath massage chair is coupled to the bathtub.

9. A bath massage system configured to be removably coupled to a bathtub and at least partially submerged in water within the bathtub when in use, the bath massage system, comprising:

a back support configured to support a torso of a user when the user is seated in the bath massage system, the back support comprising:

a back massage system comprising one or more actuators; and a back heating element coupled to the back massage system and configured to heat the back support; and a mounting assembly comprising:

a mounting system fixedly coupled to a rear surface of the back support, the mounting system including a slot positioned therein; and a mounting bracket configured to releasably attach to a surface of the bathtub, the mounting bracket including a mounting flange configured to fit within the slot;

wherein the mounting system is configured to receive the mounting flange to selectively couple the back support to the bathtub.

10. The bath massage system of claim 9, further comprising a pillow configured to support a head or neck of the user when the user is seated in the bath massage system, the pillow comprising:

a pillow massage system configured to massage the head or neck of the user, the pillow massage system comprising a first massage actuator and a second massage actuator; and a pillow heating element configured to heat the pillow;

wherein the first massage actuator positioned opposite the second massage actuator along a horizontal axis of the pillow.

11. The bath massage system of claim 9, further comprising a seat coupled to a lower portion of the back support, extending substantially perpendicular to the back support, and configured to support a lower body of the user when the user is seated in the bath massage system.

12. The bath massage system of claim 9, wherein the back massage system comprises:

a third actuator; and a fourth actuator positioned opposite the third actuator, the third actuator coupled to the fourth actuator by a skeleton extending therebetween.

13. The bath massage system of claim 12, wherein the back heating element comprises a first heating element and a second heating element positioned opposite the first heating element; and wherein the first heating element is coupled to the third actuator and the second heating element is coupled to the fourth actuator.

14. The bath massage system of claim 9, wherein the mounting assembly is coupled rearward the back support and comprises a first receiving end coupled to the back support and a second receiving end coupled to the bathtub.

15. The bath massage system of claim 9, further comprising a track extending between an upper portion and a lower portion of the back support, the one or more actuators coupled to the track.

16. A bath massage pillow configured to be removably coupled to a bathtub and to support a head or neck of a user in the bathtub, the bath massage pillow comprising:

a first end;

a second end positioned opposite the first end;

a body portion extending between the first end and the second end, the body portion comprising:

a pillow massage system configured to massage the head or neck of the user; and a heating element positioned proximate the massage system, the heating element configured to heat the pillow;

wherein the body portion comprises a waterproof pillow cover or is formed of a material configured to protect the bath massage pillow from water in the bathtub;

a support stand coupled to the body portion, the support stand being adjustable in height such that the support stand allows vertical translation of the body portion relative to the bathtub; and a mounting system configured to couple the support stand to the bathtub.

17. The bath massage pillow of claim 16, further comprising a controller operably coupled to the massage system and the heating element, the controller configured to actuate the massage system and the heating element between an on and off position.

18. The bath massage pillow of claim 16, wherein a length of the body portion in a first direction extending from the first end to the second end is approximately twice a height of the body portion in a second direction perpendicular the first direction.

19. The bath massage pillow of claim 16, further comprising a first audio system and a second audio system; and wherein the first audio system is coupled to the first end and the second audio system is coupled to the second end.

* * * * *